(12) United States Patent
Shin

(10) Patent No.: US 12,099,682 B2
(45) Date of Patent: *Sep. 24, 2024

(54) DRIVING METHOD, TOUCH SENSING CIRCUIT, DISPLAY PANEL, AND TOUCH DISPLAY DEVICE

(71) Applicant: LG DISPLAY CO., LTD., Seoul (KR)

(72) Inventor: MyungHo Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,546

(22) Filed: Aug. 2, 2023

(65) Prior Publication Data
US 2023/0376143 A1 Nov. 23, 2023

Related U.S. Application Data

(63) Continuation of application No. 17/461,463, filed on Aug. 30, 2021, now Pat. No. 11,755,142, which is a (Continued)

(30) Foreign Application Priority Data

Jun. 30, 2016 (KR) .................. 10-2016-0083114

(51) Int. Cl.
G06F 3/041 (2006.01)
G02F 1/1333 (2006.01)
G06F 3/044 (2006.01)

(52) U.S. Cl.
CPC ...... *G06F 3/04166* (2019.05); *G02F 1/13338* (2013.01); *G06F 3/0412* (2013.01); *G06F 3/0418* (2013.01); *G06F 3/044* (2013.01)

(58) Field of Classification Search
None
See application file for complete search history.

(56) References Cited

U.S. PATENT DOCUMENTS 9,285,913 B1 3/2016 Kang et al.
9,753,586 B2 * 9/2017 Marino ............... G06F 3/04182
(Continued)

FOREIGN PATENT DOCUMENTS

CN 103135840 A 6/2013
CN 104142770 A 11/2014
(Continued)

OTHER PUBLICATIONS

U.S. Appl. No. 17/461,463, filed Aug. 30, 2021.
U.S. Appl. No. 16/780,641, filed Feb. 3, 2020.
U.S. Appl. No. 15/387,222, filed Dec. 21, 2016.

*Primary Examiner* — Fred Tzeng
(74) *Attorney, Agent, or Firm* — Birch, Stewart, Kolasch & Birch, LLP

(57) ABSTRACT

A display device can include a display panel including a gate line, a data line, and a pixel connected to the gate line and the data line; a plurality of touch electrodes; and a touch sensing circuit configured to supply a first touch driving signal to a first touch electrode in a first touch time section of a first frame, the first frame including a first display time section and the first touch time section, and supply a second touch driving signal to the first touch electrode in a second touch time section of a second frame, the second frame including a second display time section and the second touch time section. Also, a frequency of the first touch driving signal supplied to the first touch electrode is different from a frequency of the second touch driving signal applied to the first touch electrode.

15 Claims, 34 Drawing Sheets

Related U.S. Application Data continuation of application No. 16/780,641, filed on Feb. 3, 2020, now Pat. No. 11,126,302, which is a continuation of application No. 15/387,222, filed on Dec. 21, 2016, now Pat. No. 10,572,055.

(56) References Cited

U.S. PATENT DOCUMENTS

| | | | |
|---|---|---|---|
| 9,760,192 B2* | 9/2017 | Peterson | H03K 17/9622 |
| 9,990,093 B2* | 6/2018 | Lai | G06F 3/0443 |
| 10,042,470 B2 | 8/2018 | Shin et al. | |
| 10,146,365 B2* | 12/2018 | Takahashi | G06F 3/04182 |
| 10,162,457 B2* | 12/2018 | Ito | G06F 1/3262 |
| 2008/0062139 A1 | 5/2008 | Hotelling et al. | |
| 2011/0084857 A1 | 4/2011 | Marino et al. | |
| 2013/0147732 A1 | 6/2013 | Peterson et al. | |
| 2013/0207938 A1 | 8/2013 | Ryshtun et al. | |
| 2014/0152618 A1 | 6/2014 | Kida et al. | |
| 2014/0225848 A1 | 8/2014 | Ogura et al. | |
| 2015/0070303 A1 | 3/2015 | Zhao | |
| 2015/0153900 A1 | 6/2015 | Chang et al. | |
| 2016/0328056 A1 | 11/2016 | Lai | |
| 2016/0357321 A1* | 12/2016 | Ito | G09G 3/36 |
| 2017/0010739 A1 | 1/2017 | Ito et al. | |
| 2017/0068384 A1 | 3/2017 | Kim et al. | |
| 2017/0131829 A1 | 5/2017 | Takahashi et al. | |
| 2017/0192596 A1 | 7/2017 | Lee et al. | |
| 2018/0011572 A1 | 1/2018 | Wang | |
| 2018/0095597 A1 | 4/2018 | Kwon et al. | |
| 2018/0113559 A1 | 4/2018 | Bae et al. | |
| 2019/0206293 A1 | 7/2019 | Tian et al. | |
| 2019/0384452 A1 | 12/2019 | Kang et al. | |

FOREIGN PATENT DOCUMENTS

| | | |
|---|---|---|
| CN | 104407748 A | 3/2015 |
| CN | 104423695 A | 3/2015 |
| CN | 104571753 A | 4/2015 |
| CN | 104808883 A | 7/2015 |
| CN | 105404436 A | 3/2016 |
| JP | 2011-107761 A | 6/2011 |
| JP | 2012-59265 A | 3/2012 |
| JP | 2013-20479 A | 1/2013 |
| JP | 2015-99462 A | 5/2015 |
| JP | 2015-141557 A | 8/2015 |
| JP | 2016-24805 A | 2/2016 |
| JP | 2016-29588 A | 3/2016 |
| KR | 10-0950496 B1 | 3/2010 |
| KR | 10-1295537 B1 | 8/2013 |
| KR | 10-2014-0072804 A | 6/2014 |
| KR | 10-2014-0126352 A | 10/2014 |
| KR | 10-2016-0009805 A | 1/2016 |

* cited by examiner

DRIVING METHOD, TOUCH SENSING CIRCUIT, DISPLAY PANEL, AND TOUCH DISPLAY DEVICE

CROSS-REFERENCE TO RELATED APPLICATIONS

This application is a Continuation of U.S. patent application Ser. No. 17/461,463, filed on Aug. 30, 2021, which is a Continuation of U.S. patent application Ser. No. 16/780,641, filed on Feb. 3, 2020 (now U.S. Pat. No. 11,126,302 issued on Sep. 21, 2021), which is a Continuation of U.S. patent application Ser. No. 15/387,222, filed on Dec. 21, 2016 (now U.S. Pat. No. 10,572,055 issued on Feb. 25, 2020), which claims priority to Korean Patent Application No. 10-2016-0083114, filed in the Republic of Korea on Jun. 30, 2016, all of these applications are hereby incorporated by reference for all purposes as if fully set forth herein.

BACKGROUND

Technical Field

The embodiments of the disclosure relate to a driving method, a touch sensing circuit, a display panel, and a touch display device.

Description of the Related Art

With advancement of information-oriented societies, various kinds of demands for display devices for displaying images have increased, and various types of display devices have been used, such as a liquid crystal display device (LCD), a plasma display panel (PDP), and an organic light-emitting display device (OLED). Among such display devices, touch display devices that can provide a touch-based input system enabling a user to easily and intuitively input information or commands in addition to a normal input system using buttons, keyboards, mouse, and the like are known.

In order to provide such a touch-based input system, such touch display devices need to detect a user's touch and accurately detect a touched coordinate (a touch position). For this purpose, a capacitive touch system that detects a touch and a touch coordinate on the basis of a variation in capacitance between plural touch electrodes disposed as touch sensors in a touch panel (a touch screen panel) or capacitance between the touch electrodes and a point such as a finger using the touch electrodes has been widely employed.

On the other hand, an electronic device such as a touch display device having a touch sensing function has to satisfy a condition that an electromagnetic interference (EMI) level is equal to or less than a predetermined level. However, the touch display devices have a problem in that the EMI level is considerably high due to a touch driving signal for sensing a touch.

Particularly, when a touch driving signal applied to the touch electrodes to sense a touch is a pulse type (rectangular wave) signal having a predetermined frequency, an influence of the EMI may further increase. There is also a problem in that the EMI deteriorates system stability of a touch display device, deteriorates touch sensing performance by affecting a sensing voltage at the time of sensing a touch or the like, or deteriorates display performance by affecting voltages required for displaying an image.

SUMMARY

An object of the present disclosure is to provide a driving method, a touch sensing circuit, a display panel, and a touch display device that can prevent electromagnetic interference (EMI). Another object of the present disclosure is to provide a driving method, a touch sensing circuit, a display panel, and a touch display device that can prevent EMI in a touch section and prevent unnecessary parasitic capacitance from being generated. Still another object of the present disclosure is to provide a driving method, a touch sensing circuit, a display panel, and a touch display device that can perform touch driving using a multi-frequency driving method capable of preventing EMI.

According to an aspect of the present disclosure, there is provided a touch display device having a display panel in which a plurality of data lines and a plurality of gate lines are arranged and a plurality of sub pixels defined by the plurality of data lines and the plurality of gate lines are arranged, and having a display mode for displaying an image and a touch mode for sensing a touch. The touch display device includes: a plurality of touch electrodes that are arranged outside or inside the display panel; and a touch sensing circuit that outputs a touch driving signal of a pulse type for driving at least one of the plurality of touch electrodes and senses a touch or a touch position in one or more touch sections for the touch mode. Each touch section for the touch mode includes k or more unit touch sections where k is a natural number equal to or greater than 2. The touch driving signal output in each of the k or more unit touch sections has a constant frequency. The frequency of the touch driving signal output in at least one unit touch section of the k or more unit touch sections is different from the frequency of the touch driving signal output in another unit touch section.

According to another aspect of the present disclosure, there is provided a driving method of a touch display device having a display panel in which a plurality of data lines and a plurality of gate lines are arranged and a plurality of sub pixels defined by the plurality of data lines and the plurality of gate lines are arranged, the touch display device having a display mode for displaying an image and a touch mode for sensing a touch. The driving method includes: driving data lines and gate lines in a display section for the display mode; and outputting a touch driving signal of a pulse type for driving at least one of a plurality of touch electrodes, which are arranged outside or inside the display panel, in a touch section for the touch mode. Each touch section includes k (where k is a natural number equal to or greater than 2) or more unit touch sections. The touch driving signal output in each of the k or more unit touch sections has a constant frequency. The frequency of the touch driving signal output in at least one unit touch section of the k or more unit touch sections is different from the frequency of the touch driving signal output in another unit touch section.

According to still another aspect of the present disclosure, there is provided a touch sensing circuit that is included in a touch display device having a display mode for displaying an image and a touch mode for sensing a touch. The touch sensing circuit includes: a driving circuit that outputs a touch driving signal of a pulse type for driving at least one of a plurality of touch electrodes in one or more touch sections for the touch mode; and a sensing circuit that detects a capacitance variation in each of the plurality of touch electrodes and senses a touch or a touch position. Each of the one or more touch sections for the touch mode includes k or more unit touch sections, where k is a natural number equal to or greater than 2. The touch driving signal output in each of the k or more unit touch sections has a constant frequency. The frequency of the touch driving signal output in at least one unit touch section of the k or more unit touch sections is different from the frequency of the touch driving signal output in another unit touch section.

According to still another aspect of the present disclosure, there is provided a touch sensing circuit that is included in a touch display device having a display mode for displaying an image and a touch mode for sensing a touch. The touch sensing circuit includes: a signal output unit that outputs a touch driving signal of a pulse type for driving at least one of a plurality of touch electrodes for sensing a touch in one or more touch sections for the touch mode; and a signal detecting unit that detects a signal for sensing a touch from the touch electrode supplied with the touch driving signal. Each of the one or more touch sections for the touch mode includes k or more unit touch sections, where k is a natural number equal to or greater than 2. The touch driving signal output in each of the k or more unit touch sections has a constant frequency. The frequency of the touch driving signal output in at least one unit touch section of the k or more unit touch sections is different from the frequency of the touch driving signal output in another unit touch section.

According to still another aspect of the present disclosure, there is provided a display panel including: a plurality of data lines that are supplied with data voltages corresponding to an image signal in a display section; a plurality of gate lines that are supplied with a scan signal in the display section; and a plurality of touch electrodes that are supplied with a touch driving signal of a pulse type in one or more touch sections. Each of the one or more touch sections includes k or more unit touch sections, where k is a natural number equal to or greater than 2. The touch driving signal output in each of the k or more unit touch sections has a constant frequency. The frequency of the touch driving signal output in at least one unit touch section of the k or more unit touch sections may be different from the frequency of the touch driving signal output in another unit touch section.

According to exemplary embodiments of the present disclosure, it is possible to provide a driving method, a touch sensing circuit, a display panel, and a touch display device that can prevent electromagnetic interference (EMI). Accordingly, it is possible to prevent deterioration in system stability, display performance, and touch sensing performance due to EMI.

According to exemplary embodiments of the present disclosure, it is possible to provide a driving method, a touch sensing circuit, a display panel, and a touch display device that can prevent EMI in a touch section and prevent unnecessary parasitic capacitance from being generated. According to exemplary embodiments of the present disclosure, it is possible to provide a driving method, a touch sensing circuit, a display panel, and a touch display device that can perform touch driving using a multi-frequency driving method (a frequency varying method) capable of preventing EMI.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
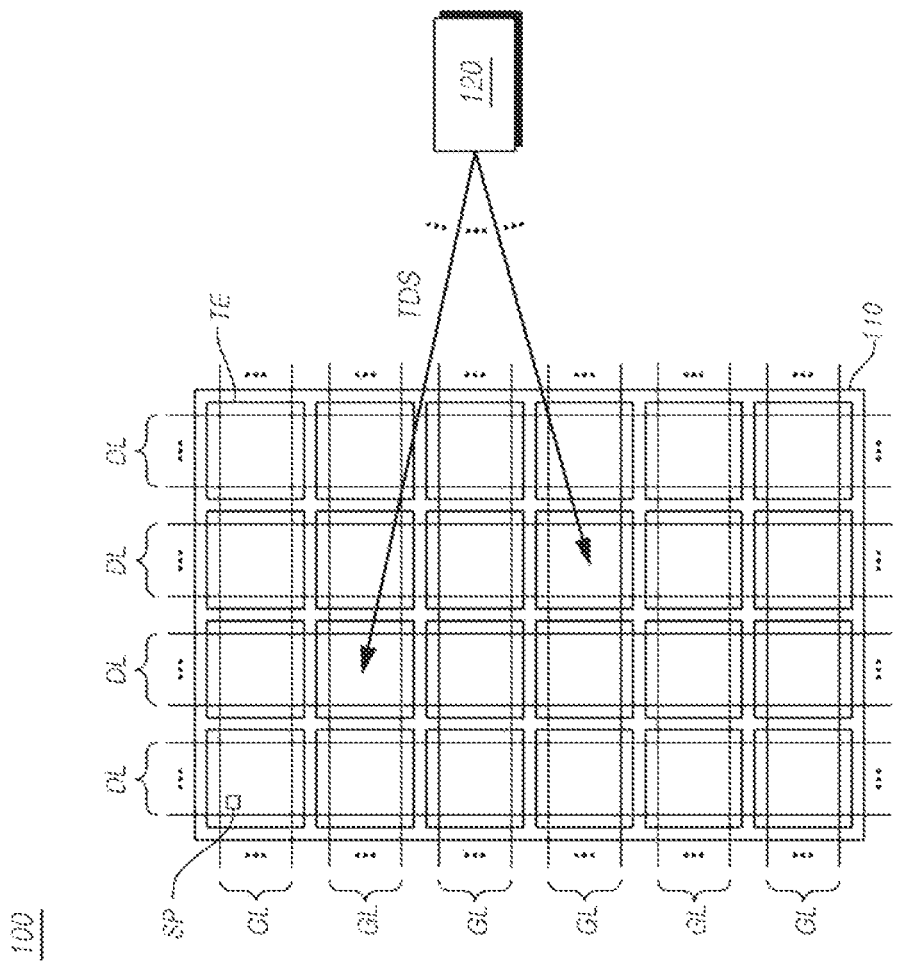
FIG. 1 is a diagram schematically illustrating a system configuration of a touch display device according to an embodiment of the present disclosure.

Hereinafter, some embodiments of the disclosure will be described in detail with reference to the accompanying illustrative drawings. In denoting elements of the drawings by reference numerals, the same elements will be referenced by the same reference numerals although the elements are illustrated in different drawings. In the following description of the disclosure, detailed description of known functions and configurations incorporated herein will be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

Figure 2:
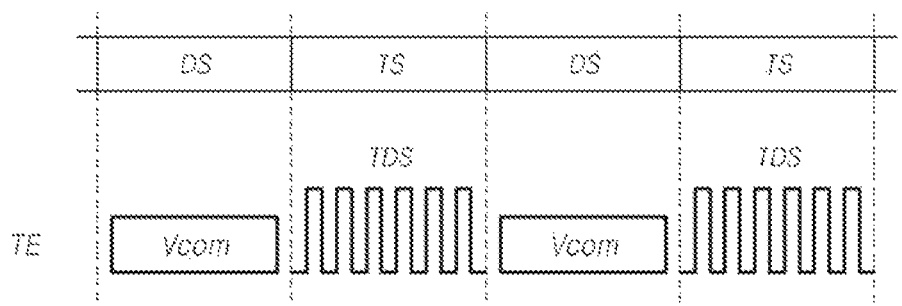
FIG. 2 is a diagram illustrating a signal which is applied to a touch electrode in a display section and a touch section in the touch display device according to an embodiment of the present disclosure.

FIG. 1 is a diagram schematically illustrating a system configuration of a touch display device 100 according to an embodiment of the present disclosure. FIG. 2 is a diagram illustrating a signal which is applied to a touch electrode TE in display sections DS and touch sections TS in the touch display device 100 according to an embodiment of the present disclosure.

The touch display device 100 according to the embodiment of the present disclosure includes a display panel 110 in which plural data lines DL supplied with data voltages corresponding to image signals and plural gate lines GL supplied with a scan signal are arranged and plural sub pixels SP defined by the data lines DL and the gate lines GL are arranged. The touch display device 100 according to the embodiment of the present disclosure has two operation modes including a display mode for displaying an image and a touch mode for sensing a touch.

In a display section for the display mode, data voltages corresponding to image signals are supplied to the data lines and a scan signal is sequentially supplied to the gate lines. The touch display device 100 according to the embodiment of the present disclosure includes a data driving circuit and a gate driving circuit for operation in the display mode. In a display section DS in which the touch display device 100 according to the embodiment of the present disclosure operates in the display mode, the data driving circuit drives the data lines DL and the gate driving circuit drives the gate lines GL.

The touch display device 100 according to the embodiment of the present disclosure includes a touch sensing circuit 120 for operation in the touch mode. In a touch section TS in which the touch display device 100 according to the exemplary embodiments operates in the touch mode, the touch sensing circuit 120 outputs a touch driving signal TDS of a pulse type (for example, a pulse width modulation (PWM) type) for driving at least one of plural touch electrodes TE electrically connected thereto via signal lines SL to sense a touch or a touch position.

As a touch electrode driving method, the touch sensing circuit 120 may sequentially drive at least one of the touch electrodes (a sequential driving method) or may simultaneously drive all the touch electrodes TE (a simultaneous driving method). When the touch electrode driving method is the sequentially driving method or the simultaneous driving method, the touch sensing circuit 120 sequentially senses a touch and a touch position using a signal received from at least one of the touch electrodes TE as a sensing process of sensing (detecting) a touch and/or a touch position.

On the other hand, the touch sensing circuit 120 may detect a capacitance variation and sense a touch and/or a touch position on the basis of the detected capacitance variation. That is, the touch display device 100 according to the embodiment of the present disclosure can sense a touch using a capacitance-based touch sensing method. The capacitance-based touch sensing method includes a self-capacitance-based touch sensing method of detecting a capacitance variation between a pointer such as a finger or a pen and the touch electrode TE to sense a touch and a mutual-capacitance-based touch sensing method of detecting a capacitance variation between two types of touch sensors to sense a touch. The mutual-capacitance-based touch sensing method is a method of detecting a capacitance variation between two types of touch sensors (a driving electrode and a receiving electrode) to sense a touch using a driving electrode (which is also referred to as a Tx electrode) supplied with the touch driving signal TDS and a receiving electrode (which is also referred to as an Rx electrode) corresponding to the driving electrode. In the mutual-capacitance-based touch sensing method, the driving electrode (Tx electrode) supplied with the touch driving signal TDS among the two types of touch sensors corresponds to the touch electrode TE in this specification.

The self-capacitance-based touch sensing method is a method of supplying a touch driving signal to the touch electrode TE and detecting a signal from the touch electrode TE supplied with the touch driving signal to detect the capacitance variation. The touch electrode TE corresponding to one type of touch sensor functions as the driving electrode and the receiving electrode which are used in the mutual-capacitance-based touch sensing method. The touch display device 100 according to the embodiment of the present disclosure may perform touch driving and touch sensing using the self-capacitance-based touch sensing method or may perform the touch driving and the touch sensing using the mutual-capacitance-based touch sensing method. In the following description, for the purpose of convenience of explanation, it is assumed that the touch driving and the touch sensing are performed using the self-capacitance-based touch sensing method.

Accordingly, the touch sensing circuit 120 can drive at least one of the touch electrodes TE and detect a capacitance variation of the touch electrodes TE on the basis of a signal received from the touch electrodes to sense a touch and/or a touch position. On the other hand, the touch electrodes TE functioning as touch sensors may be arranged in a touch panel which is present outside the display panel 110 or may be disposed inside the display panel 110. In this way, when the touch electrodes TE are disposed in the display panel 110, the touch electrodes TE can be arranged in an in-cell type or an on-cell type.

On the other hand, when the touch display device 100 according to the embodiment of the present disclosure operates in the display mode, a common voltage Vcom can be applied to all the sub pixels. For this purpose, a common voltage electrode supplied with the common voltage Vcom is disposed in the display panel 110. When the touch electrodes TE are disposed inside the display panel 110, the touch electrodes TE can function as a common voltage electrode which is supplied with the common voltage Vcom in the display sections DS. When the touch display device 100 is a liquid crystal display device, the common voltage Vcom is used to cause a potential difference from a pixel voltage (corresponding to a data voltage) of each sub pixel and to express gray scales of the sub pixel.

As described above, when the touch electrodes TE are used as the common voltage electrode, the touch electrodes TE functions as the common voltage electrode in the display section DS and functions as the touch sensor in the touch section TS in the touch display device 100 according to the embodiment of the present disclosure as illustrated in FIG. 2.

Referring to FIG. 2, the display section DS and the touch section TS are defined by temporally dividing one frame. Depending on the methods of temporally dividing one frame into the display sections DS and the touch sections TS, the touch sensing method can be classified into a V-sensing method illustrated in FIG. 3 and an H-sensing method illustrated in FIG. 4.

Figure 3:
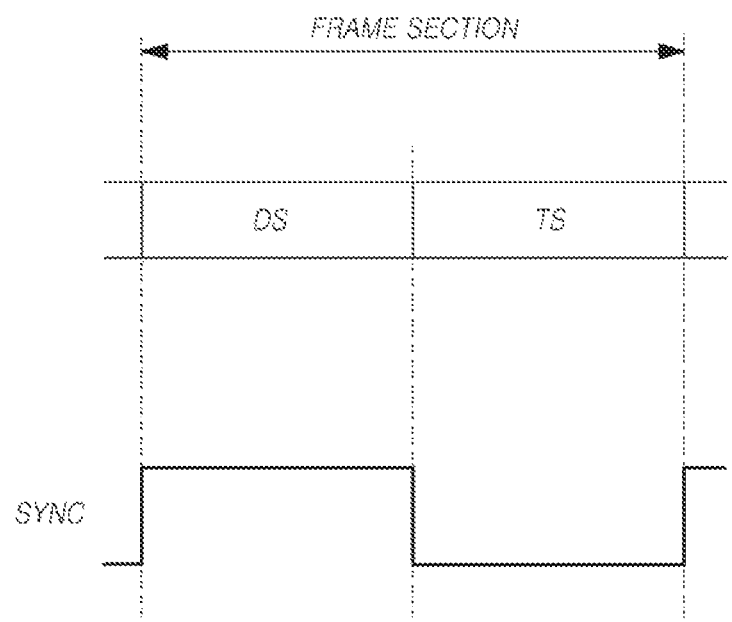
FIG. 3 is a diagram illustrating display sections and touch sections based on a V-sensing method in the touch display device according to an embodiment of the present disclosure.
Figure 4:
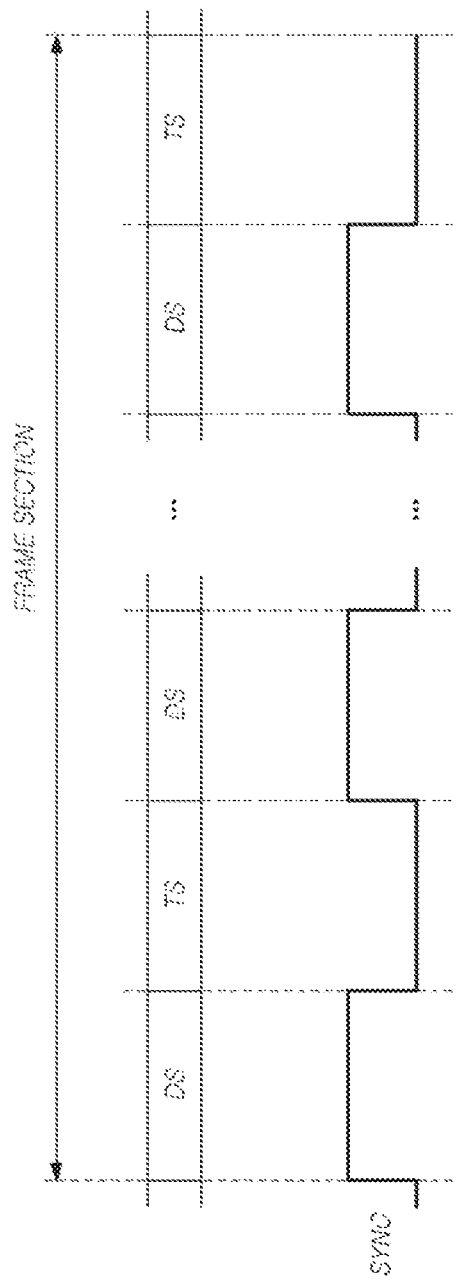
FIG. 4 is a diagram illustrating display sections and touch sections based on an H-sensing method in the touch display device according to an embodiment of the present disclosure.

FIG. 3 is a diagram illustrating a display section DS and a touch section TS based on the V-sensing method in the touch display device 100 according to an embodiment of the present disclosure. FIG. 4 is a diagram illustrating display sections DS and touch sections DS based on the H-sensing method in the touch display device 100 according to an embodiment of the present disclosure.

Referring to FIG. 3, in the V-sensing method, one frame is temporally divided into one display section DS and one or more touch sections TS. In the one display section DS, the touch display device 100 performs display driving for one frame. In the one or more touch sections (TS), the touch display device 100 senses a touch or a touch position for one frame.

Referring to FIG. 4, in the H-sensing method, one frame is temporally divided into two or more display sections DS and one or more touch sections TS. In the two or more display sections DS, the touch display device 100 performs display driving for one frame. In the two or more touch sections TS, the touch display device 100 senses a touch or a touch position for one frame.

Referring to FIGS. 3 and 4, the display section DS and the touch section TS can be defined by a synchronization signal SYNC. The synchronization signal SYNC may be generated by a control element such as a timing controller and be transmitted to a circuit for the display driving (for example, the data driving circuit and the gate driving circuit) and a circuit for the touch driving (for example, the touch sensing circuit 120). Referring to FIGS. 3 and 4, in the synchronization signal SYNC, a high-level section (or a low-level section) corresponds to the display section DS, and the low-level section (or the high-level section) corresponds to the touch section TS.

Figure 5:
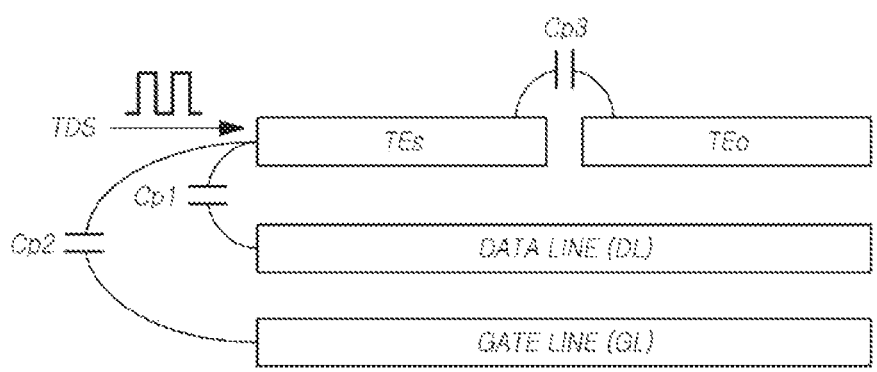
FIG. 5 is a diagram illustrating parasitic capacitance components which are generated in the touch display device according to an embodiment of the present disclosure.

FIG. 5 is a diagram illustrating parasitic capacitance components Cp1, Cp2, and Cp3 generated in the touch display device 100 according to an embodiment of the present disclosure. Referring to FIG. 5, when a touch driving signal TDS is supplied to one or more touch electrodes TEs, the touch electrodes TEs supplied with the touch driving signal TDS can form the parasitic capacitance component Cp1 in cooperation with the data line DL, forms the parasitic capacitance component Cp2 in cooperation with the gate line GL, and form the parasitic capacitance component Cp3 in cooperation with another touch electrode TEo not supplied with the touch driving signal TDS.

In this way, the parasitic capacitance components Cp1, Cp2, and Cp3 generated in the touch section TS may function as a load in the touch sensing to decrease sensing accuracy. Accordingly, the touch display device 100 according to the embodiments of the present disclosure can perform load-free driving capable of preventing or reducing generation of the parasitic capacitance components Cp1, Cp2, and Cp3 functioning as a load at the time of sensing a touch when at least one of the touch electrodes TE is driven in the touch section TS.

Figure 6:
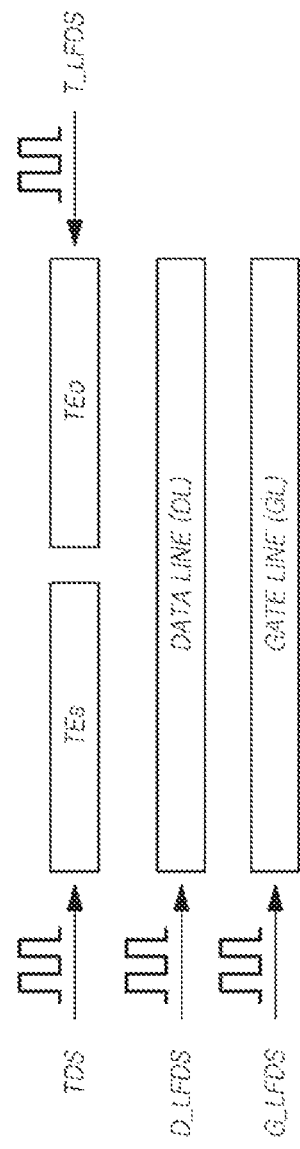
FIG. 6 is a diagram illustrating load-free driving in the touch display device according to an embodiment of the present disclosure.

FIG. 6 is a diagram illustrating the load-free driving of the touch display device 100 according to an embodiment of the present disclosure. Referring to FIG. 6, the touch display device 100 according to the embodiment of the present disclosure can supply a load-free driving signal D_LFDS to all or a part of the data lines DL when a touch driving signal TDS is supplied to one or more touch electrodes TEs in the touch section TS.

Some data lines DL supplied with the load-free driving signal D_LFDS among the data lines DL may be data lines arranged at positions corresponding to the touch electrodes TEs supplied with the touch driving signal TDS. The load-free driving signal D_LFDS supplied to all or some of the data lines DL may be a touch driving signal TDS or a signal corresponding to the touch driving signal TDS. When the load-free driving signal D_LFDS corresponds to the touch driving signal TDS, the load-free driving signal D_LFDS may have the same frequency as the touch driving signal TDS, the same phase as the touch driving signal TDS, and the same amplitude as the touch driving signal TDS.

Accordingly, a potential difference is not generated between the touch electrode TEs supplied with the touch driving signal TDS and the data line DL supplied with the load-free driving signal D_LFDS and it is thus possible to prevent the parasitic capacitance Cp1 from being formed between the touch electrode TEs supplied with the touch driving signal TDS and the data line DL supplied with the load-free driving signal D_LFDS.

Referring to FIG. 6, the touch display device 100 according to the embodiment of the present disclosure can supply a load-free driving signal G_LFDS to all or some of the gate lines GL when a touch driving signal TDS is supplied to one or more touch electrodes TEs in the touch section TS. Some gate lines GL supplied with the load-free driving signal D_LFDS among the gate lines GL may be gate lines arranged at positions corresponding to the touch electrodes TEs supplied with the touch driving signal TDS.

The load-free driving signal G_LFDS supplied to all or some of the gate lines GL may be a touch driving signal TDS or a signal corresponding to the touch driving signal TDS. When the load-free driving signal G_LFDS corresponds to the touch driving signal TDS, the load-free driving signal G_LFDS may have the same frequency as the touch driving signal TDS, the same phase as the touch driving signal TDS, and the same amplitude as the touch driving signal TDS. Accordingly, a potential difference is not generated between the touch electrode TEs supplied with the touch driving signal TDS and the gate line GL supplied with the load-free driving signal G_LFDS and it is thus possible to prevent the parasitic capacitance Cp2 from being formed between the touch electrode TEs supplied with the touch driving signal TDS and the gate line GL supplied with the load-free driving signal G_LFDS.

Referring to FIG. 6, the touch display device 100 according to the embodiment of the present disclosure can supply a load-free driving signal T_LFDS to another touch electrode TEo not supplied with a touch driving signal TDS when the touch driving signal TDS is supplied to one or more touch electrodes TEs in the touch section TS. The another touch electrode TEo supplied with the load-free driving signal T_LFDS among the touch electrodes TE may be a touch electrode TE arranged adjacent to the touch electrode TEs supplied with the touch driving signal TDS or all the other touch electrodes TE. The load-free driving signal T_LFDS supplied to another touch electrode TEo may be a touch driving signal TDS or a signal corresponding to the touch driving signal TDS.

When the load-free driving signal T_LFDS corresponds to the touch driving signal TDS, the load-free driving signal T_LFDS may have the same frequency as the touch driving signal TDS, the same phase as the touch driving signal TDS, and the same amplitude as the touch driving signal TDS. Accordingly, a potential difference is not generated between the touch electrode TEs supplied with the touch driving signal TDS and the another touch electrode supplied with the load-free driving signal T_LFDS and it is thus possible to prevent the parasitic capacitance Cp3 from being formed between the touch electrode TEs supplied with the touch driving signal TDS and the another touch electrode TEo supplied with the load-free driving signal T_LFDS.

In the above-mentioned load-free driving, the load-free driving signal (at least one of D_LFDS, G_LFDS, and T_LFDS) supplied to at least one of the data line DL, the gate line GL, and the touch electrode TEo may be the same signal as the touch driving signal TDS or may be a signal different from or similar to the touch driving signal TDS as long as parasitic capacitance can be removed. Even when the touch sensing circuit 120 outputs a load-free driving signal completely equal to the touch driving signal TDS, the frequency, phase, voltage (amplitude), or signal waveform (signal shape) of the load-free driving signal actually supplied to the data line DL, the gate line, or the touch electrode TEo may be different from the frequency, phase, voltage (amplitude), or signal waveform (signal shape) of the touch driving signal TDS due to panel characteristics such as a load and a resistive-capacitive (RC) delay. In this way, a degree of difference between an output state and an actual supply state of the load-free driving signal may vary depending on a panel position (that is, a horizontal or vertical position of the data line DL, the gate line GL, or the touch electrode TEo supplied with the load-free driving signal).

In consideration of the fact that the output state and the actual supply state of the load-free driving signal are different from each other depending on the panel characteristics and the supply position, the touch driving signal or the load-free driving signal can be output after the output state thereof such that the actually supplied load-free driving signal is equal to the actually supplied touch driving signal. Accordingly, the touch driving signal output from the touch sensing circuit 120 and the load-free driving signal output from a load-free driving circuit (for example, the touch sensing circuit, the data driver, or the gate driver) may be equal to each other in all of frequency, phase, voltage (amplitude), and signal waveform (signal shape) or may be different from each other in at least one of frequency, phase, voltage (amplitude), and signal waveform (signal shape).

On the other hand, in the touch display device 100, when at least one of the touch electrodes TE is sequentially driven using a touch driving signal TDS of a pulse type having a single frequency (for example, several tens of KHz to several hundreds of KHz) in the touch section TS, electromagnetic interference (EMI) may occur in harmonic frequency components due to a variation in voltage level of the touch driving signal TDS. Particularly, in the touch display device 100, when at least one of the touch electrodes TE is sequentially driven using a touch driving signal TDS of a pulse type (a rectangular wave) having a single frequency (for example, several tens of KHz to several hundreds of KHz) in the touch section TS and load-free driving of at least one of another touch electrode TEo, the data line DL, and the gate line GL is further performed at this time, the EMI due to the touch driving signal TDS may be intensified.

Figure 7:
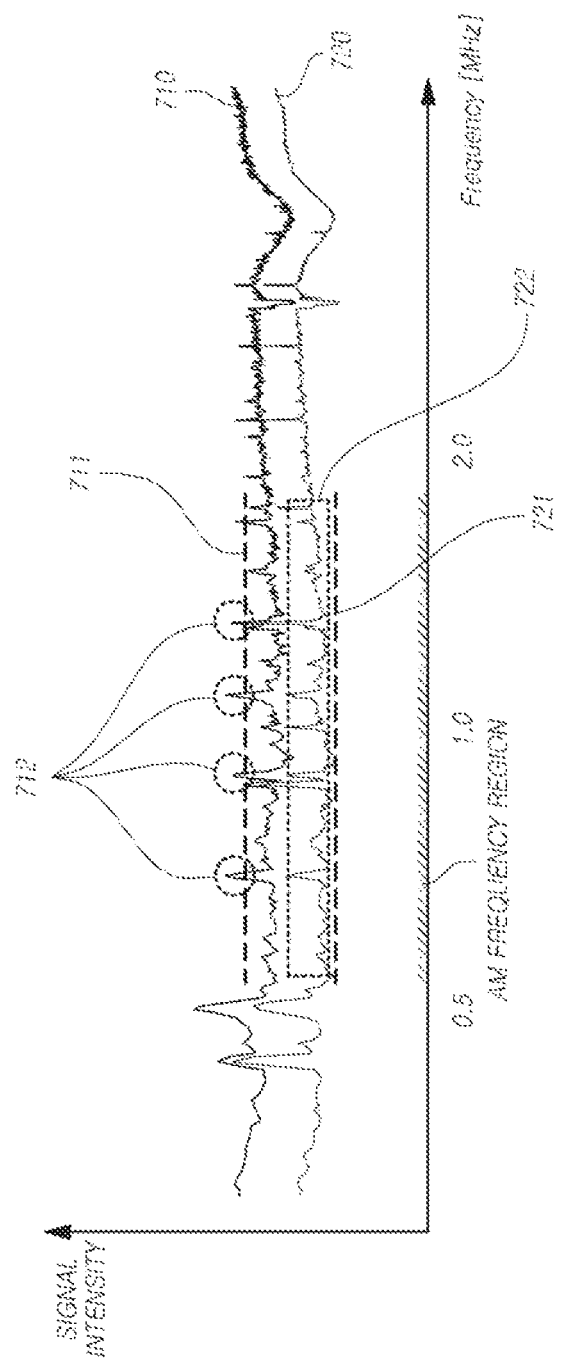
FIG. 7 is a diagram illustrating an electromagnetic interference (EMI) measurement result in touch sections in the touch display device according to an embodiment of the present disclosure.

FIG. 7 is a diagram illustrating an EMI measurement result in a touch section TS in the touch display device 100 according to an embodiment of the present disclosure. Referring to FIG. 7, when the touch display device 100 drives the touch electrodes TE using the touch driving signal TDS having a single frequency of 100 KHz, EMI may occur in an amplitude modulation (AM) frequency region (for example, about 500 KHz to about 1,605 KHz) due to the touch driving signal TDS.

FIG. 7 is a graph illustrating an upper-limit measured value 710 and an average measured value 720 of an EMI signal by frequencies which are obtained by measuring intensity of the EMI signal by frequencies. From the measurement result, it can be confirmed that there is a point 712 at which the upper-limit measured value 710 of the EMI signal is greater than a reference upper limit value 711 which is a minimum upper limit value for satisfying an EMI condition in the AM frequency region. From the measurement result, it can be confirmed that there is a point 722 at which the average measured value 720 of the EMI signal is greater than a reference average value 721 which is a minimum upper limit value for satisfying an EMI condition in the AM frequency region. That is, as the measurement result, the upper-limit measured value 710 and the average measured value 720 of the EMI signal may not satisfy the EMI condition in the AM frequency region. Therefore, the touch display device 100 according to the embodiment of the present disclosure can provide a multi-frequency driving method to suppress an EMI phenomenon due to the touch driving signal TDS.

Figure 8:
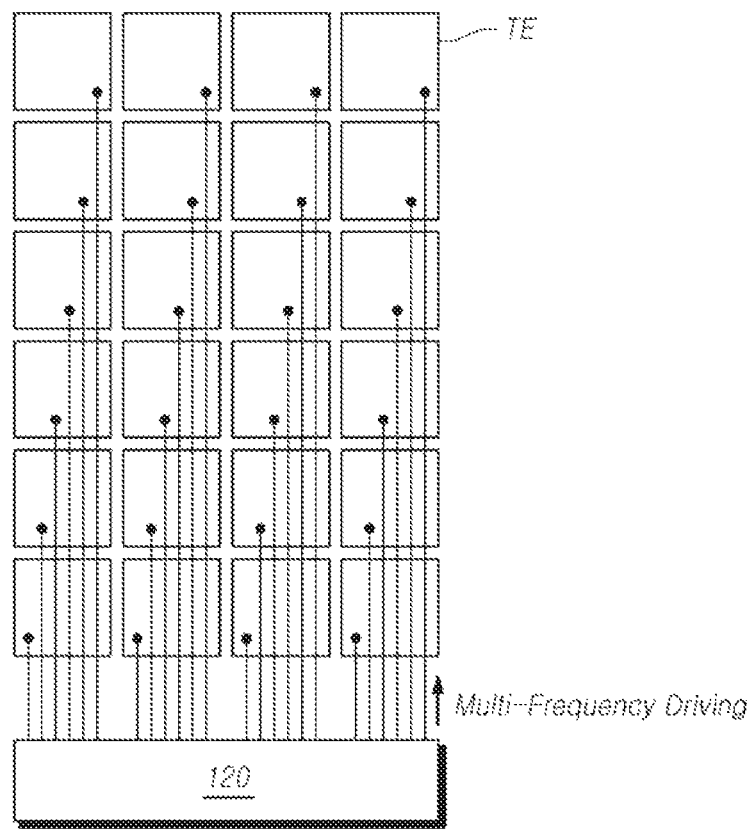
FIG. 8 is a diagram illustrating waveform modulation driving for EMI improvement in the touch display device according to an embodiment of the present disclosure.

FIG. 8 is a diagram illustrating multi-frequency driving for EMI suppression in the touch display device 100 according to an embodiment of the present disclosure. Referring to FIG. 8, the touch sensing circuit 120 of the touch display device 100 according to the embodiment of the present disclosure drives the touch electrodes TE using the touch driving signal TDS having two or more frequencies while modulating the frequency of the touch driving signal TDS.

In this touch driving method, a waveform having different amplitude levels, that is, two or more amplitude levels or a trapezoidal waveform or a triangular (sawtooth-shaped) waveform having amplitude varying with a predetermined gradient may be used as a waveform of the first touch driving signal TDS for driving the touch electrodes TE. According to the multi-frequency driving, the frequency of the touch driving signal TDS output from the touch sensing circuit 120 can be modulated.

As described above, according to the multi-frequency driving, an EMI charge share phenomenon occurs with the modulation of the frequency of the touch driving signal TDS output from the touch sensing circuit 120, and an EMI phenomenon due to the touch driving signal TDS can be suppressed. In other words, the embodiment of the present disclosure provide a touch sensing method, a touch sensing circuit 120, and a touch display device 100 that can perform touch driving using a multi-frequency driving method to suppress EMI.

Here, the multi-frequency driving method is a touch driving method using frequency modulation of a touch driving signal and the frequency modulation of a touch driving signal can be performed using a technique of adjusting a section length of a section (a unit touch section) in which a single frequency is used or a technique of adjusting the number of pulses in a section in which a single frequency is used. The multi-frequency driving of driving the touch electrodes TE using a touch driving signal TDS having two or more frequencies based on the frequency modulation of the touch driving signal TDS will be described below in more detail.

Figure 9:
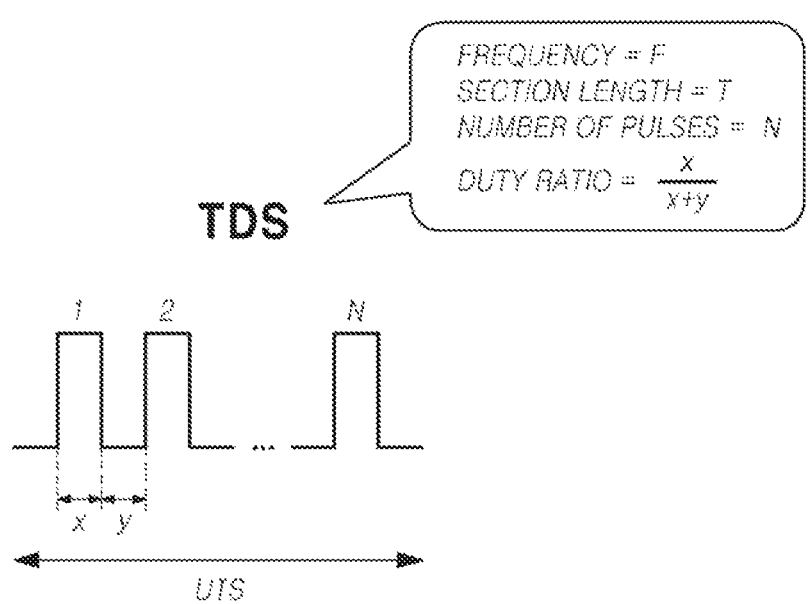
FIG. 9 is a diagram illustrating signal characteristics of touch driving signals in a unit touch section in which a touch driving signal of a single frequency is output for the purpose of explaining multi-frequency driving characteristics in the touch display device according to an embodiment of the present disclosure.

FIG. 9 is a diagram illustrating signal characteristics of a touch driving signal TDS in a unit touch section UTS in which the touch driving signal TDS of a single frequency is output for the purpose of explaining multi-frequency driving characteristics in the touch display device 100 according to an embodiment of the present disclosure. When the touch electrodes TE are driven in a multi-frequency manner using a touch driving signal TDS having two or more frequencies based on the frequency modulation of the touch driving signal TDS, a section in which the touch electrode TE is driven using the touch driving signal TDS of a single frequency is present. This section is referred to as a unit touch section UTS.

FIG. 9 illustrates the touch driving signal TDS in a unit touch section UTS. Referring to FIG. 9, a unit touch section UTS has a predetermined section length T. A touch driving signal TDS of a pulse type output from the touch sensing circuit 120 in a unit touch section UTS has a predetermined frequency F and a number of pulses N. The section length T of a unit touch section UTS is within the duration of one touch section TS.

The touch driving signal TDS of a pulse type output from the touch sensing circuit 120 in a unit touch section UTS has a duty ratio which is defined by a length x of a high level section and a length y of a low level section. The duty ratio of the touch driving signal TDS is x/(x+y) and may vary depending on the unit touch sections UTS or may be fixed in all the unit touch sections UTS.

For example, it is assumed that the duty ratio of the touch driving signal TDS is 50% which is fixed in all the unit touch sections UTS. That is, it is assumed that the length x of a high level section and the length y of a low level section in the touch driving signal TDS are equal to each other.

FIGS. 10 to 13 are diagrams illustrating examples in which the touch display device 100 according to embodiments of the present disclosure modulates a frequency of a touch driving signal to perform multi-frequency driving for each touch section TS. FIGS. 14 to 17 are diagrams illustrating examples in which the touch display device 100 according to an embodiment of the present disclosure modulates a frequency of a touch driving signal to perform multi-frequency driving in each touch section TS. The multi-frequency driving method may vary depending on how the unit touch sections UTS are allocated.

As illustrated in FIGS. 10 to 13, one touch section TS may correspond to one unit touch section UTS. In this way, when one touch section TS includes a single unit touch section UTS, the frequency of the touch driving signal TDS is constant in one touch section TS corresponding to one unit touch section UTS and the frequency of the touch driving signal TDS varies depending on the touch sections TS. Unlike this, as illustrated in FIGS. 14 to 17, one touch section TS may correspond to k (where k is a natural number equal to or greater than 2) unit touch sections UTS. In this way, when one touch section TS includes two or more unit touch sections UTS, the frequency of the touch driving signal TDS may vary depending on the unit touch sections UTS.

According to the multi-frequency driving, when there are two or more unit touch sections UTS in which the touch driving signal TDS have the same frequency, the frequencies of the touch driving signals TDS output in the two or more unit touch sections UTS are different from each other. The frequency of each of the touch driving signals TDS output in the two or more unit touch sections UTS can be defined by the section length T of the unit touch section UTS and the number of pulses N of the touch driving signal TDS in the unit touch section UTS.

According to the first frequency modulation technique, the section lengths T of the two or more unit touch sections UTS may be equal to each other and the numbers of pulses N of the touch driving signals TDS in the two or more unit touch sections UTS may be different from each other. According to the second frequency modulation technique, the section lengths T of the two or more unit touch sections UTS may be different from each other and the numbers of pulses N of the touch driving signals TDS in the two or more unit touch sections UTS may be equal to each other. The multi-frequency driving method depending on the allocation methods of the unit touch sections UTS will be described below in more detail.

Figure 10:
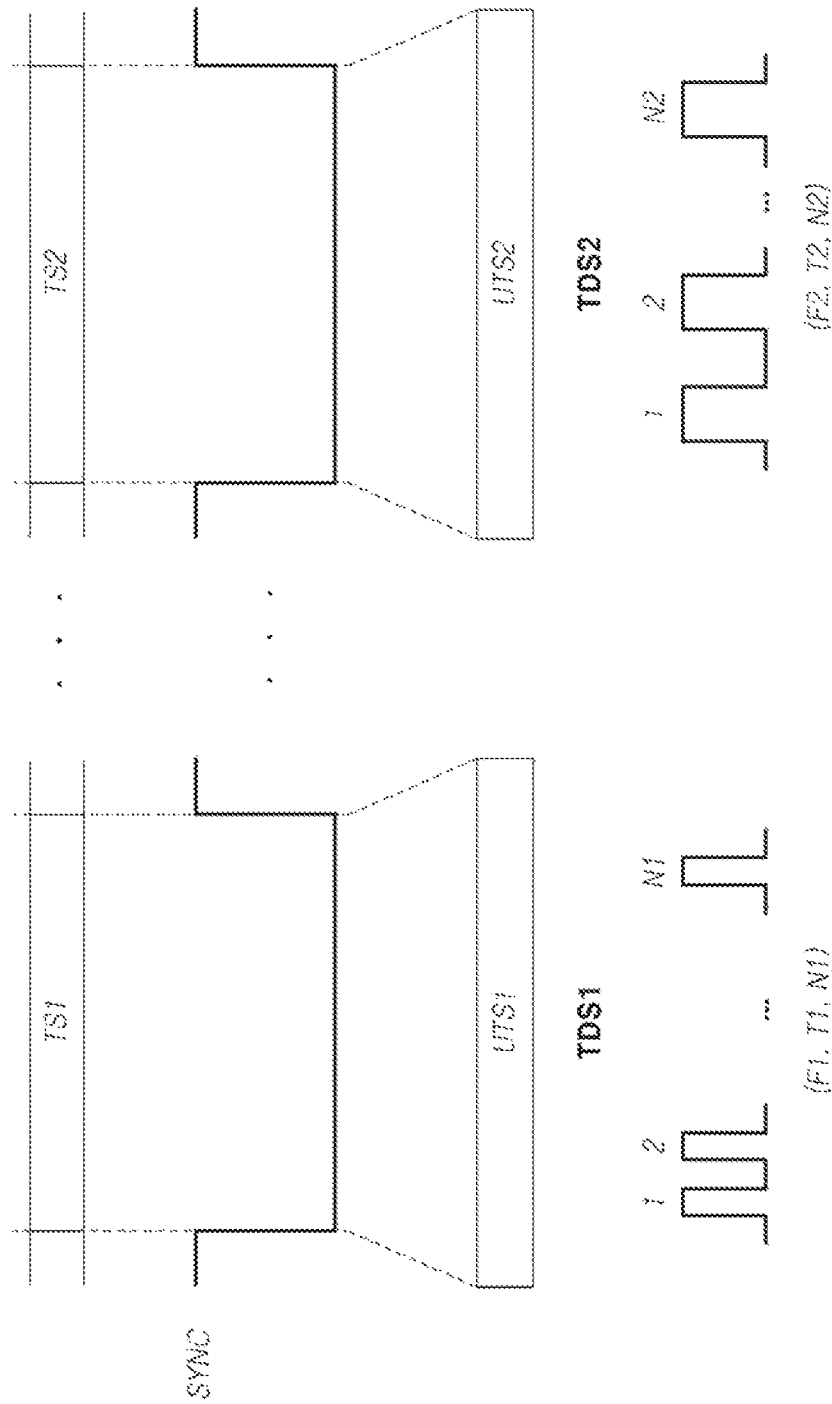
FIG. 10 is a diagram illustrating an example in which the touch display device according to an embodiment of the present disclosure modulates a frequency of a touch driving signal to perform multi-frequency driving for each touch section.

The multi-frequency driving method when one touch section TS includes a single unit touch section UTS will be first described below with reference to FIGS. 10 to 13. Referring to FIG. 10, a first unit touch section UTS1 in which a touch driving signal TDS1 of a first frequency F1 is output and a second unit touch section UTS2 in which a touch driving signal TDS2 of a second frequency F2 is output are present to correspond to a first touch section TS1 and a second touch section TS2.

The first frequency F1 of the touch driving signal TDS1 in the first unit touch section UTS1 is different from the second frequency F2 of the touch driving signal TDS2 in the second unit touch section UTS2. The first frequency F1 of the touch driving signal TDS1 in the first unit touch section UTS1 can be defined by a section length T1 of the first unit touch section UTS1 and the number of pulses N1 in the first unit touch section UTS1 as expressed by Expression 1.

$$F1 \propto \frac{N1}{T1} \qquad \text{Expression 1}$$

The second frequency F2 of the touch driving signal TDS2 in the second unit touch section UTS2 can be defined by a section length T2 of the second unit touch section UTS1 and the number of pulses N2 in the second unit touch section UTS2 as expressed by Expression 2.

$$F2 \propto \frac{N2}{T2} \qquad \text{Expression 2}$$

As described above, by adjusting the number of pulses N of the touch driving signal TDS in each unit touch section UTS or the section length T of each unit touch section UTS, the frequency F of the touch driving signal TDS in each unit touch section UTS can be efficiently modulated.

Figure 11:
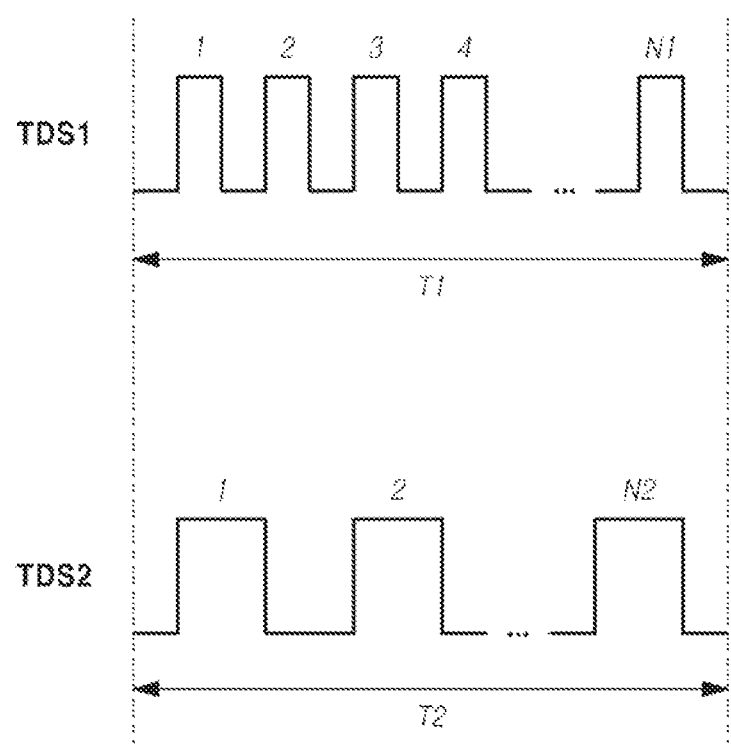
FIG. 11 is a diagram illustrating a frequency modulating method based on the number of pulses in unit touch sections when the touch display device according to an embodiment of the present disclosure modulates a frequency of a touch driving signal to perform multi-frequency driving for each touch section.

As illustrated in FIG. 11, by adjusting the number of pulses N of the touch driving signal TDS in each unit touch section UTS, the frequency F of the touch driving signal TDS can be modulated. According to the frequency modulating method based on the number of pulses, the section length T1 of the first unit touch section UTS1 and the section length T2 of the second unit touch section UTS2 are equal to each other and the number of pulses N1 of the touch driving signal TDS1 in the first unit touch section UTS1 and the number of pulses N2 of the touch driving signal TDS2 in the second unit touch section UTS2 are different from each other.

Referring to FIG. 11, by outputting the touch driving signal TDS2 with the number of pulses N2 less than the number of pulses N1 of the touch driving signal TDS1 in the first unit touch section UTS1 in the second unit touch section UTS2 having the section length T2 equal to the section length T1 of the first unit touch section UTS1, the second frequency F2 of the touch driving signal TDS2 in the second unit touch section UTS2 can be made to be lower than the first frequency F1 of the touch driving signal TDS1 in the first unit touch section UTS1. As described above, according to the frequency modulating method based on the number of pulses, since the section lengths T of the unit touch sections UTS are equal to each other, the frequency components can be temporally evenly distributed and it is thus possible to obtain a better EMI suppression effect due to the effective distribution of the EMI components.

Figure 12:
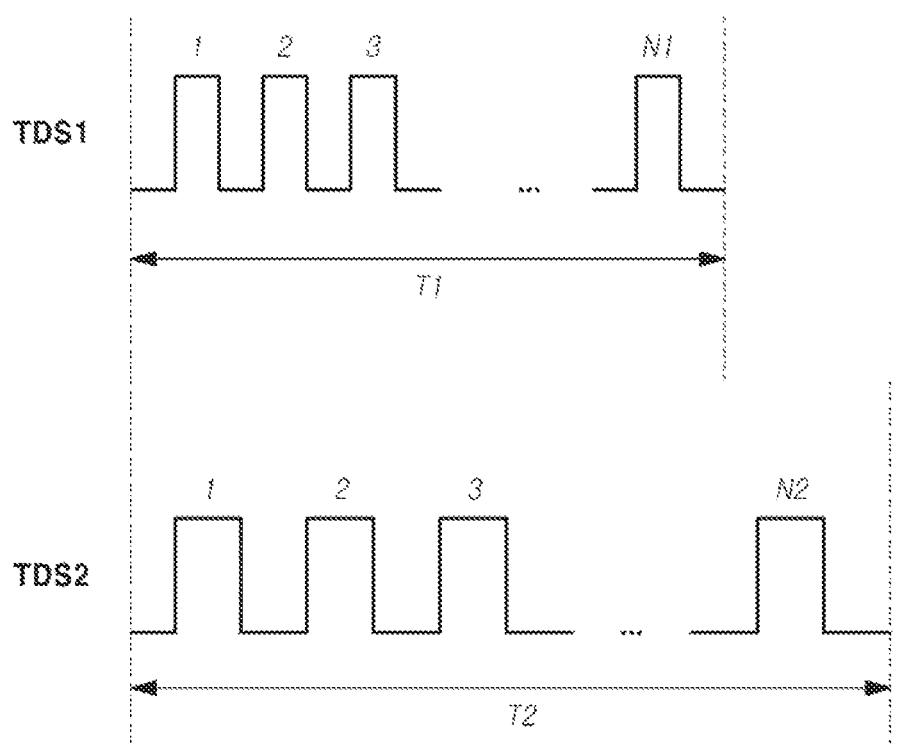
FIG. 12 is a diagram illustrating a frequency modulating method based on section lengths of unit touch sections when the touch display device according to an embodiment of the present disclosure modulates a frequency of a touch driving signal to perform multi-frequency driving for each touch section.

On the other hand, as illustrated in FIG. 12, the frequency F of the touch driving signal TDS can be modulated by adjusting the section length T of each unit touch section UTS. According to the frequency modulating method based on the section length, the number of pulses N1 of the touch driving signal TDS1 in the first unit touch section UTS1 and the number of pulses N2 of the touch driving signal TDS2 in the second unit touch section UTS2 are equal to each other, and the section length T1 of the first unit touch section UTS1 and the section length T2 of the second unit touch section UTS2 are different from each other.

Referring to FIG. 12, by outputting the touch driving signal TDS2 with the number of pulses N2 equal to the number of pulses N1 of the touch driving signal TDS1 in the first unit touch section UTS1 in the second unit touch section UTS2 having the section length T2 larger than the section length T1 of the first unit touch section UTS1, the second frequency F2 of the touch driving signal TDS2 in the second unit touch section UTS2 can be made to be lower than the first frequency F1 of the touch driving signal TDS1 in the first unit touch section UTS1. As described above, according to the frequency modulating method based on the section length, since the numbers of pulses N of the unit touch sections UTS are equal to each other, it is possible to easily generate pulses for the frequency modulation.

Figure 13:
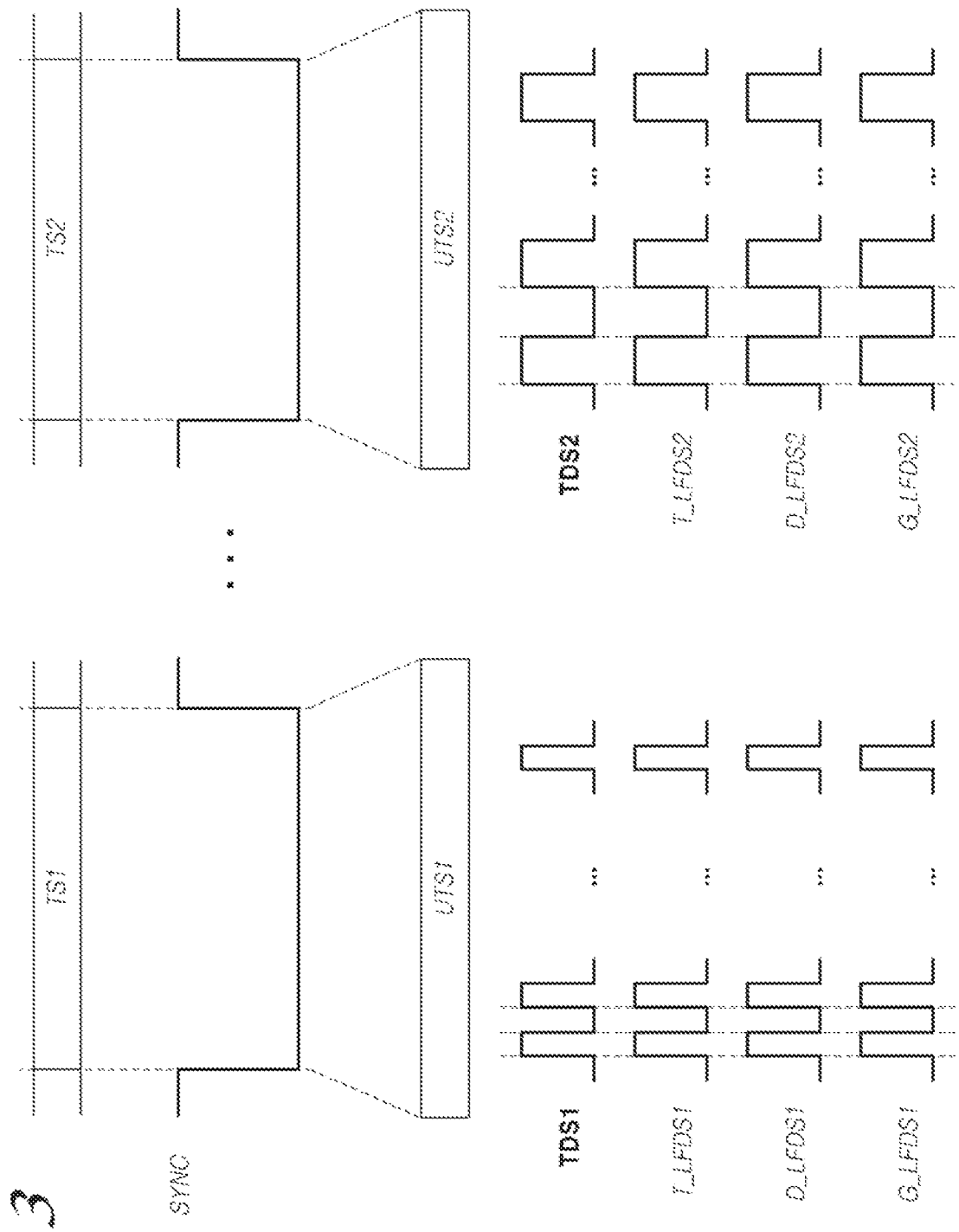
FIG. 13 is a diagram illustrating load-free driving when the touch display device according to an embodiment of the present disclosure modulates a frequency of a touch driving signal to perform multi-frequency driving for each touch section.

FIG. 13 is a diagram illustrating load-free driving (LFD) when the touch display device 100 according to an embodiment of the present disclosure modulates a frequency of a touch driving signal TDS to perform multi-frequency driving for each touch section TS. When the frequency of the touch driving signal TDS is modulated to perform multi-frequency driving for each touch section TS, a load-free driving signal D_LFDS can be supplied to all or a part of the data lines DL in a touch section in which a touch driving signal TDS is supplied to at least one of the touch electrodes TE. The load-free driving signal D_LFDS supplied to all or a part of the data lines DL may be the touch driving signal TDS or may be a signal corresponding to the touch driving signal TDS in frequency, phase, or amplitude. When the frequency of the touch driving signal TDS is changed from F1 to F2 by the multi-frequency driving, the frequency of the load-free driving signal D_LFDS supplied to all or a part of the data lines DL can be changed from F1 to F2.

Referring to FIG. 13, the frequency of a load-free driving signal D_LFDS1 output to the data lines DL in the first unit touch section UTS1 is determined depending on the first frequency F1 of the touch driving signal TDS1 output in the first unit touch section UTS1, and the frequency of a load-free driving signal D_LFDS2 output to the data lines DL in the second unit touch section UTS2 is determined depending on the second frequency F2 of a touch driving signal TDS2 output in the second unit touch section UTS2. Accordingly, a potential difference is not generated between the touch electrode TE supplied with the touch driving signal TDS and the data line DL supplied with the load-free driving signal D_LFDS even when the multi-frequency driving is performed, and it is thus possible to prevent parasitic capacitance Cp1 from being formed between the touch electrode TEs supplied with the touch driving signal TDS and the data line DL supplied with the load-free driving signal D_LFDS.

When the frequency of the touch driving signal TDS is modulated to perform multi-frequency driving for each touch section TS, a load-free driving signal G_LFDS can be supplied to all or a part of the gate lines GL in a touch section in which a touch driving signal TDS is supplied to at least one of the touch electrodes TE. The load-free driving signal G_LFDS supplied to all or a part of the gate lines GL may be the touch driving signal TDS or may be a signal corresponding to the touch driving signal TDS in frequency, phase, or amplitude. When the frequency of the touch driving signal TDS is changed from F1 to F2 by the multi-frequency driving, the frequency of the load-free driving signal G_LFDS supplied to all or a part of the gate lines GL can be changed from F1 to F2.

Referring to FIG. 13, the frequency of a load-free driving signal G_LFDS1 output to the gate lines GL in the first unit touch section UTS1 is determined depending on the first frequency F1 of the touch driving signal TDS1 output in the first unit touch section UTS1, and the frequency of a load-free driving signal G_LFDS2 output to the gate lines GL in the second unit touch section UTS2 is determined depending on the second frequency F2 of a touch driving signal TDS2 output in the second unit touch section UTS2. Accordingly, a potential difference is not generated between the touch electrode TEs supplied with the touch driving signal TDS and the gate lines GL supplied with the load-free driving signal G_LFDS even when the multi-frequency driving is performed, and it is thus possible to prevent parasitic capacitance Cp2 from being formed between the touch electrode TEs supplied with the touch driving signal TDS and the gate lines GL supplied with the load-free driving signal G_LFDS.

When the frequency of the touch driving signal TDS is modulated to perform multi-frequency driving for each touch section TS, a load-free driving signal T_LFDS can be supplied to all or a part of other touch electrodes TE in a touch section in which a touch driving signal TDS is supplied to at least one of the touch electrodes TE. The load-free driving signal T_LFDS supplied to all or a part of the other touch electrodes TE may be the touch driving signal TDS or may be a signal corresponding to the touch driving signal TDS in frequency, phase, or amplitude. When the frequency of the touch driving signal TDS is changed from F1 to F2 by the multi-frequency driving, the frequency of the load-free driving signal T_LFDS supplied to all or a part of the other touch electrodes TE can be changed from F1 to F2.

Referring to FIG. 13, the frequency of a load-free driving signal T_LFDS1 output to the other touch electrodes TE in the first unit touch section UTS1 is determined depending on the first frequency F1 of the touch driving signal TDS1 output in the first unit touch section UTS1, and the frequency of a load-free driving signal T_LFDS2 output to the other touch electrodes TE in the second unit touch section UTS2 is determined depending on the second frequency F2 of a touch driving signal TDS2 output in the second unit touch section UTS2. Accordingly, a potential difference is not generated between the touch electrode TE supplied with the touch driving signal TDS and the other touch electrodes TEo supplied with the load-free driving signal T_LFDS even when the multi-frequency driving is performed, and it is thus possible to prevent parasitic capacitance Cp3 from being formed between the touch electrode TEs supplied with the touch driving signal TDS and the other touch electrodes TEo supplied with the load-free driving signal T_LFDS.

The multi-frequency driving method when one touch section TS includes two or more unit touch sections UTS will be described below with reference to FIGS. 14 to 17. In the following description, it is assumed that one touch section TS includes three unit touch sections UTS1, UTS2, and UTS3. It is also assumed that a first frequency F1 of a touch driving signal TDS1 in a first unit touch section UTS1, a second frequency F2 of a touch driving signal TDS2 in a second unit touch section UTS2, and a third frequency F3 of a touch driving signal TDS3 in a third unit touch section UTS3 are different from each other.

Figure 14:
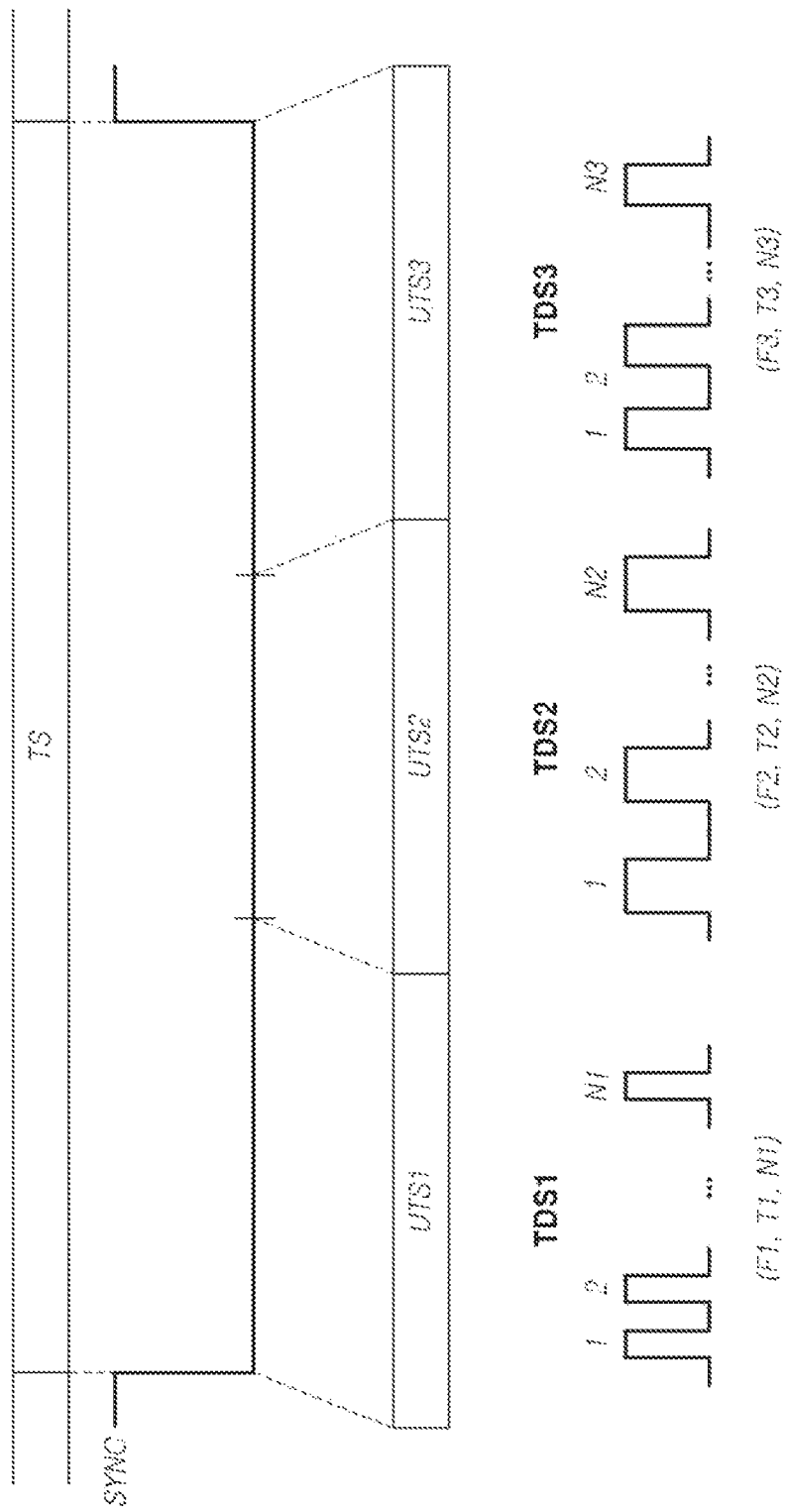
FIG. 14 is a diagram illustrating an example in which the touch display device according to an embodiment of the present disclosure modulates a frequency of a touch driving signal to perform multi-frequency driving in each touch section.

Referring to FIG. 14, one touch section TS includes the first unit touch section UTS1 in which the touch driving signal TDS1 of the first frequency F1, the second unit touch section UTS2 in which the touch driving signal TDS2 of the second frequency F2 is output, and the third unit touch section UTS3 in which the touch driving signal TDS3 of the third frequency F3 is output. The first frequency F1 of the touch driving signal TDS1 in the first unit touch section UTS1, the second frequency F2 of the touch driving signal TDS2 in the second unit touch section UTS2, and the third frequency F3 of the touch driving signal TDS3 in the third unit touch section UTS3 are not all equal to each other. That is, the first frequency F1, the second frequency F2, and the third frequency F3 may be different from each other, or two (F1 and F2, F1 and F3, or F2 and F3) of the first frequency F1, the second frequency F2, and the third frequency F3 may be equal to each other and the other one (F3, F2, or F1) may be different therefrom.

The first frequency F1 of the touch driving signal TDS1 in the first unit touch section UTS1 may be defined by a section length T1 of the first unit touch section UTS1 and the number of pulses N1 in the first unit touch section UTS1. The second frequency F2 of the touch driving signal TDS2 in the second unit touch section UTS2 may be defined by a section length T2 of the second unit touch section UTS2 and the number of pulses N2 in the second unit touch section UTS2. The third frequency F3 of the touch driving signal TDS3 in the third unit touch section UTS3 may be defined by a section length T3 of the third unit touch section UTS3 and the number of pulses N3 in the third unit touch section UTS3. As described above, it is possible to efficiently modulate the frequency F of the touch driving signal TDS in each unit touch section UTS by adjusting the number of pulses N of the touch driving signal TDS in each unit touch section UTS or the section length T of each unit touch section UTS.

Figure 15:
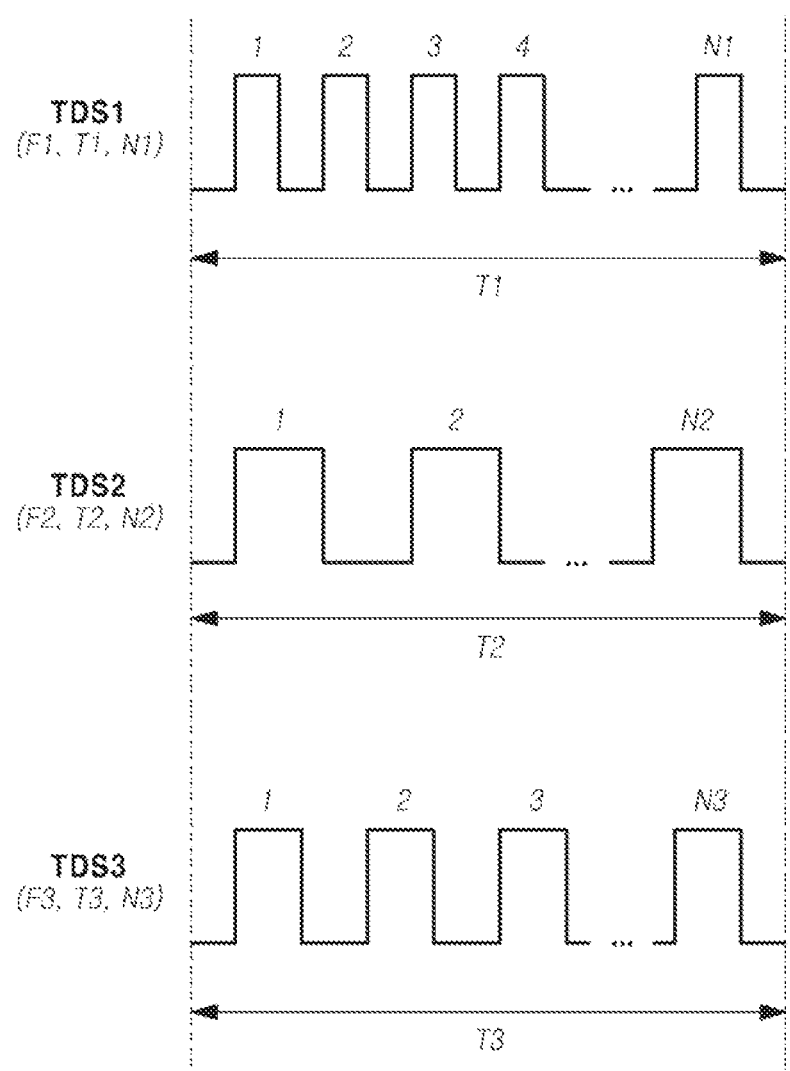
FIG. 15 is a diagram illustrating a frequency modulating method based on the number of pulses in unit touch sections when the touch display device according to an embodiment of the present disclosure modulates a frequency of a touch driving signal to perform multi-frequency driving in each touch section.

As illustrated in FIG. 15, it is possible to modulate the frequency F of the touch driving signal TDS by adjusting the number of pulses N of the touch driving signal TDS in each unit touch section UTS. In the frequency modulating method based on the number of pulses, the section length T1 of the first unit touch section UTS1, the section length T2 of the second unit touch section UTS2, and the section length T3 of the third unit touch section UTS3 may be equal to each other. However, the number of pulses N1 of the touch driving signal TDS1 in the first unit touch section UTS1, the number of pulses N2 of the touch driving signal TDS2 in the second unit touch section UTS2, and the number of pulses N3 of the touch driving signal TDS3 in the third unit touch section UTS3 are not equal to each other. That is, all of N1, N2, and N3 may not be equal to each other, or two of N1, N2, and N3 may be equal to each other and the other one may be different therefrom.

Referring to FIG. 15, by outputting the touch driving signal TDS2 with the number of pulses N2 smaller than the number of pulses N1 of the touch driving signal TDS 1 in the first unit touch section UTS1 in the second unit touch section UTS2 having the same section length T2 as the section length T1 of the first unit touch section UTS1, the second frequency F2 of the touch driving signal TDS2 in the second unit touch section UTS2 can be made to be lower than the first frequency F1 of the touch driving signal TDS1 in the first unit touch section UTS1. By outputting the touch driving signal TDS3 with the number of pulses N3 smaller than the number of pulses N1 of the touch driving signal TDS1 in the first unit touch section UTS1 and larger than the number of pulses N2 of the touch driving signal TDS2 in the second unit touch section UTS2 in the third unit touch section UTS3 having the same section length T3 as the section length T2 of the second unit touch section UTS2, the third frequency F3 of the touch driving signal TDS3 in the third unit touch section UTS3 can be made to be higher than the second frequency F2 of the touch driving signal TDS2 in the second unit touch section UTS2 and lower than the first frequency F1 of the touch driving signal TDS1 in the first unit touch section UTS1. As described above, according to the frequency modulating method based on the number of pulses, since the section lengths T of the unit touch sections UTS are equal to each other, the frequency components can be temporally evenly distributed and it is thus possible to obtain a better EMI suppression effect due to the effective distribution of the EMI components.

Figure 16:
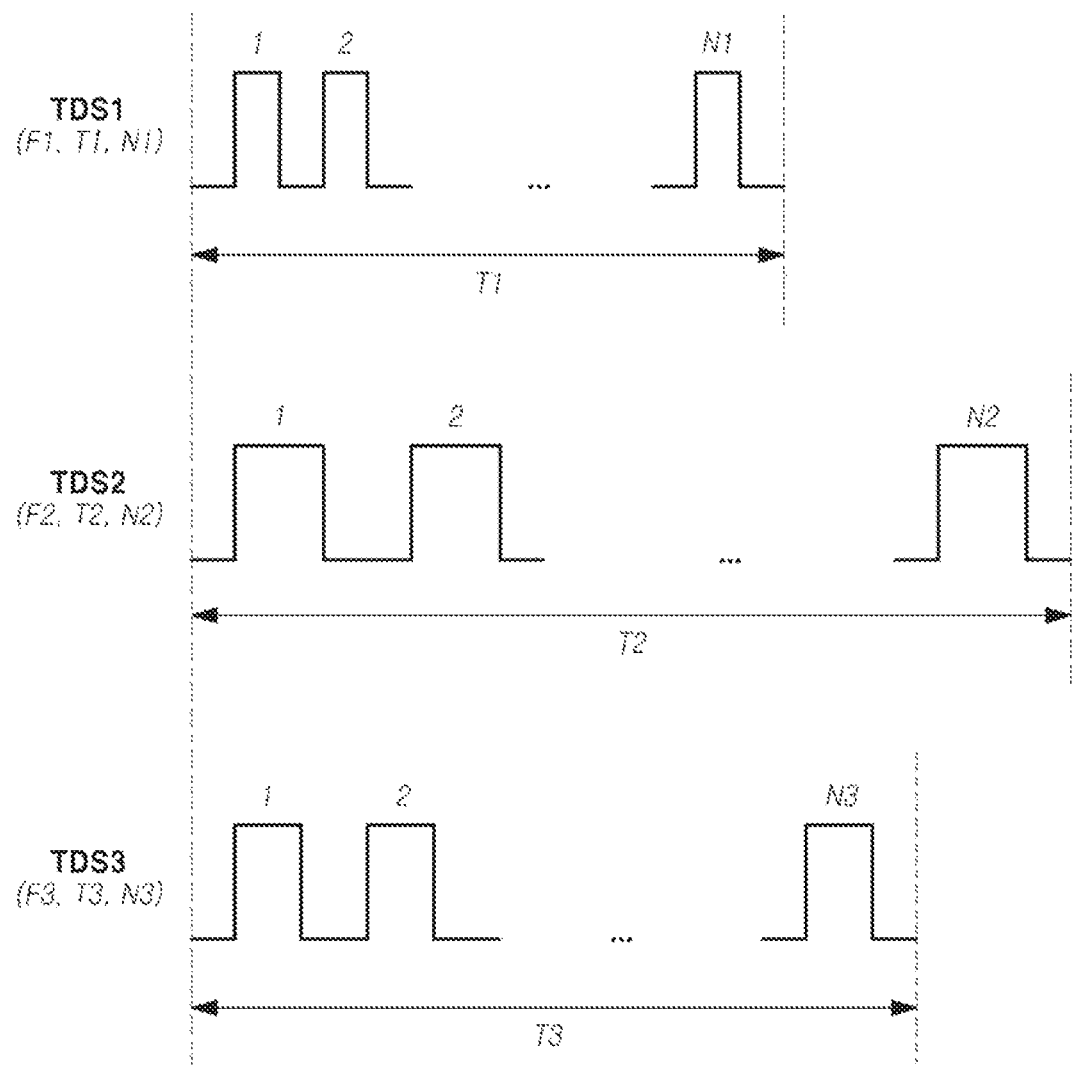
FIG. 16 is a diagram illustrating a frequency modulating method based on section lengths of unit touch sections when the touch display device according to an embodiment of the present disclosure modulates a frequency of a touch driving signal to perform multi-frequency driving in each touch section.

On the other hand, as illustrated in FIG. 16, the frequency F of the touch driving signal TDS can be modulated by adjusting the section length T of each unit touch section UTS. According to the frequency modulating method based on the section length, the number of pulses N1 of the touch driving signal TDS1 in the first unit touch section UTS1, the number of pulses N2 of the touch driving signal TDS2 in the second unit touch section UTS2, and the number of pulses N3 of the touch driving signal TDS3 in the third unit touch section UTS3 may be equal to each other.

The section length T1 of the first unit touch section UTS1, the section length T2 of the second unit touch section UTS2, and the section length T3 of the third unit touch section UTS3 may not be equal to each other. That is, T1, T2, and T3 may be different from each other, or two of T1, T2, and T3 may be equal to each other and the other one may be different therefrom.

Referring to FIG. 16, by outputting the touch driving signal TDS2 with the number of pulses N2 equal to the number of pulses N1 of the touch driving signal TDS1 in the first unit touch section UTS1 in the second unit touch section UTS2 having the section length T2 larger than the section length T1 of the first unit touch section UTS1, the second frequency F2 of the touch driving signal TDS2 in the second unit touch section UTS2 can be made to be lower than the first frequency F1 of the touch driving signal TDS1 in the first unit touch section UTS1. By outputting the touch driving signal TDS3 with the number of pulses N3 equal to the number of pulses N2 of the touch driving signal TDS2 in the second unit touch section UTS2 in the third unit touch section UTS3 having the section length T3 smaller than the section length T2 of the second unit touch section UTS2 and larger than the section length T1 of the first unit touch section UTS1, the third frequency F3 of the touch driving signal TDS3 in the third unit touch section UTS3 can be made to be higher than the second frequency F2 of the touch driving signal TDS2 in the second unit touch section UTS2 and lower than the first frequency F1 of the touch driving signal TDS1 in the first unit touch section UTS1. As described above, according to the frequency modulating method based on the section length, since the numbers of pulses N of the unit touch sections UTS are equal to each other, it is possible to easily generate pulses for the frequency modulation.

Figure 17:
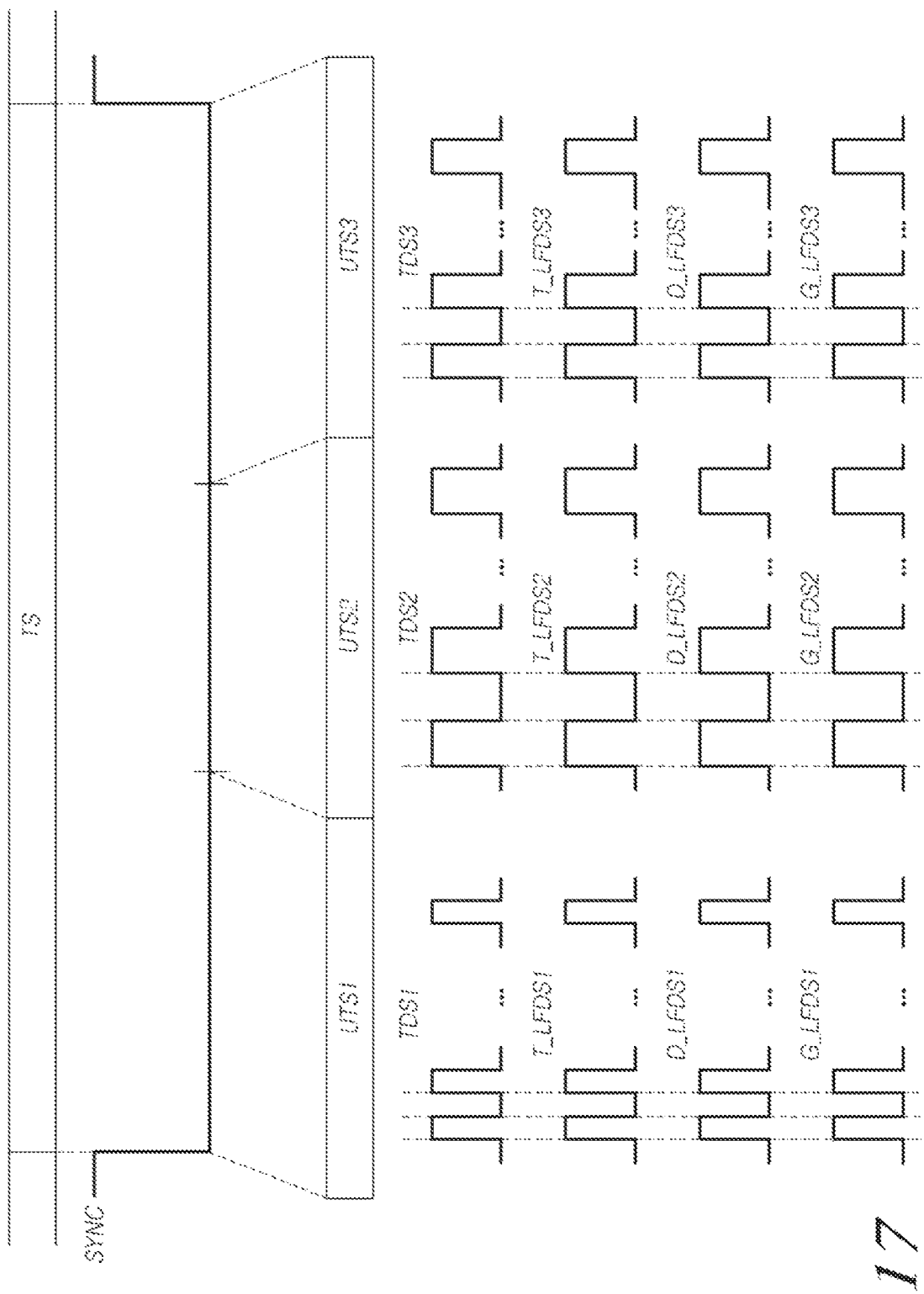
FIG. 17 is a diagram illustrating load-free driving when the touch display device according to an embodiment of the present disclosure modulates a frequency of a touch driving signal to perform multi-frequency driving in each touch section.

FIG. 17 is a diagram illustrating load-free driving (LFD) when the touch display device 100 according to an embodiment of the present disclosure modulates a frequency of a touch driving signal TDS to perform multi-frequency driving in each touch section. When the frequencies of the touch driving signals TDS1, TDS2, and TDS3 are modulated to perform the multi-frequency driving for each unit touch section UTS1, UTS2, or UTS3 in the touch section TS, load-free driving signals D_LFDS1, D_LFDS2, and D_LFDS3 can be supplied to all or a part of the data lines DL in the touch section in which the touch driving signals TDS1, TDS2, and TDS3 are supplied to at least one of the touch electrodes TE. The load-free driving signals D_LFDS1, D_LFDS2, and D_LFDS3 supplied to all or a part of the data lines DL may be the touch driving signals TDS1, TDS2, and TDS3 or may be signals corresponding to the touch driving signals TDS1, TDS2, and TDS3 in frequency and phase.

When the frequencies of the touch driving signals TDS1, TDS2, and TDS3 are changed to F1, F2, and F3 by the multi-frequency driving, the frequencies of the load-free driving signals D_LFDS1, D_LFDS2, and D_LFDS3 supplied to all or a part of the data lines DL can also be changed to F1, F2, and F3. That is, when the frequencies of the touch driving signals TDS1, TDS2, and TDS3 are changed with the change of the unit touch section, the frequencies of the load-free driving signals D_LFDS1, D_LFDS2, and D_LFDS3 supplied to all or a part of the data lines DL can be changed in synchronization therewith.

Referring to FIG. 17, the frequency of the load-free driving signal D_LFDS1 output to the data lines DL in the first unit touch section UTS1 is determined depending on the first frequency F1 of the touch driving signal TDS1 output in the first unit touch section UTS1, the frequency of the load-free driving signal D_LFDS2 output to the data lines DL in the second unit touch section UTS2 is determined depending on the second frequency F2 of the touch driving signal TDS2 output in the second unit touch section UTS2, and the frequency of the load-free driving signal D_LFDS3 output to the data lines DL in the third unit touch section UTS3 is determined depending on the third frequency F3 of the touch driving signal TDS3 output in the third unit touch section UTS3. Accordingly, a potential difference is not generated between the touch electrodes TE supplied with the touch driving signals TDS1, TDS2, and TDS3 and the data lines DL supplied with the load-free driving signals D_LFDS1, D_LFDS2, and D_LFDS3 even when the multi-frequency driving is performed, and it is thus possible to prevent parasitic capacitance Cp1 from being formed between the touch electrodes TEs supplied with the touch driving signals TDS1, TDS2, TDS3 and the data lines DL supplied with the load-free driving signals D_LFDS1, D_LFDS2, and D_LFDS3.

When the frequencies of the touch driving signals TDS1, TDS2, and TDS3 are modulated to perform the multi-frequency driving for each unit touch section UTS1, UTS2, or UTS3 in the touch section TS, load-free driving signals G_LFDS1, G_LFDS2, and G_LFDS3 can be supplied to all or a part of the gate lines GL in the touch section in which the touch driving signals TDS1, TDS2, and TDS3 are supplied to at least one of the touch electrodes TE. The load-free driving signals G_LFDS1, G_LFDS2, and G_LFDS3 supplied to all or a part of the gate lines GL may be the touch driving signals TDS1, TDS2, and TDS3 or may be signals corresponding to the touch driving signals TDS1, TDS2, and TDS3 in frequency and phase.

When the frequencies of the touch driving signals TDS1, TDS2, and TDS3 are changed by the multi-frequency driving, the frequencies of the load-free driving signals G_LFDS1, G_LFDS2, and G_LFDS3 supplied to all or a part of the gate lines GL can also be changed. That is, when the frequencies of the touch driving signals TDS1, TDS2, and TDS3 are changed with the change of the unit touch section, the frequencies of the load-free driving signals G_LFDS1, G_LFDS2, and G_LFDS3 supplied to all or a part of the gate lines GL can be changed in synchronization therewith.

Referring to FIG. 17, the frequency of the load-free driving signal G_LFDS1 output to the gate lines GL in the first unit touch section UTS1 is determined depending on the first frequency F1 of the touch driving signal TDS1 output in the first unit touch section UTS1, the frequency of the load-free driving signal G_LFDS2 output to the gate lines GL in the second unit touch section UTS2 is determined depending on the second frequency F2 of the touch driving signal TDS2 output in the second unit touch section UTS2, and the frequency of the load-free driving signal G_LFDS3 output to the gate lines GL in the third unit touch section UTS3 is determined depending on the third frequency F3 of the touch driving signal TDS3 output in the third unit touch section UTS3. Accordingly, a potential difference is not generated between the touch electrodes TE supplied with the touch driving signals TDS1, TDS2, and TDS3 and the gate lines GL supplied with the load-free driving signals G_LFDS1, G_LFDS2, and G_LFDS3 even when the multi-frequency driving is performed, and it is thus possible to prevent parasitic capacitance Cp2 from being formed between the touch electrodes TEs supplied with the touch driving signals TDS1, TDS2, TDS3 and the gate lines GL supplied with the load-free driving signals G_LFDS1, G_LFDS2, and G_LFDS3.

When the frequencies of the touch driving signals TDS1, TDS2, and TDS3 are modulated to perform the multi-frequency driving for each unit touch section UTS1, UTS2, or UTS3 in the touch section TS, load-free driving signals T_LFDS1, T_LFDS2, and T_LFDS3 can be supplied to all or a part of the other touch electrodes TE in the touch section in which the touch driving signals TDS1, TDS2, and TDS3 are supplied to at least one of the touch electrodes TE. The load-free driving signals T_LFDS1, T_LFDS2, and T_LFDS3 supplied to all or a part of the other touch electrodes TE may be the touch driving signals TDS1, TDS2, and TDS3 or may be signals corresponding to the touch driving signals TDS1, TDS2, and TDS3 in frequency and phase. When the frequencies of the touch driving signals TDS1, TDS2, and TDS3 are changed by the multi-frequency driving, the frequencies of the load-free driving signals T_LFDS1, T_LFDS2, and T_LFDS3 supplied to all or a part of the other touch electrodes TE can also be changed. That is, when the frequencies of the touch driving signals TDS1, TDS2, and TDS3 are changed with the change of the unit touch section, the frequencies of the load-free driving signals T_LFDS1, T_LFDS2, and T_LFDS3 supplied to all or a part of the other touch electrodes TE can be changed in synchronization therewith.

Referring to FIG. 17, the frequency of the load-free driving signal T_LFDS1 output to the other touch electrodes TE in the first unit touch section UTS1 is determined depending on the first frequency F1 of the touch driving signal TDS1 output in the first unit touch section UTS1, the frequency of the load-free driving signal T_LFDS2 output to the other touch electrodes TE in the second unit touch section UTS2 is determined depending on the second frequency F2 of the touch driving signal TDS2 output in the second unit touch section UTS2, and the frequency of the load-free driving signal T_LFDS3 output to the other touch electrodes TE in the third unit touch section UTS3 is determined depending on the third frequency F3 of the touch driving signal TDS3 output in the third unit touch section UTS3. Accordingly, a potential difference is not generated between the touch electrodes TE supplied with the touch driving signals TDS1, TDS2, and TDS3 and the other touch electrodes TEo supplied with the load-free driving signals T_LFDS1, T_LFDS2, and T_LFDS3 even when the multi-frequency driving is performed, and it is thus possible to prevent parasitic capacitance Cp3 from being formed between the touch electrodes TEs supplied with the touch driving signals TDS1, TDS2, TDS3 and the other touch electrodes TE supplied with the load-free driving signals T_LFDS1, T_LFDS2, and T_LFDS3.

As described above, the display section DS for the display mode and the touch section TS for the touch mode may be temporally separated from each other. On the other hand, the display mode and the touch mode may be simultaneously carried out. In this way, when the display mode and the touch mode are simultaneously carried out, the display section DS for the display mode and the touch section TS for the touch mode may match each other. In this case, the section in which the display mode and the touch section are simultaneously carried out may be referred to as a display section DS or may be referred to as a touch section TS or may be referred to as a common mode section or a simultaneously mode section.

In the section in which the display mode and the touch section are simultaneously carried out, each touch electrode simultaneously functions as a touch sensor and a display driving electrode (for example, a common electrode supplied with a common voltage). There may be two or more unit touch sections UTS in which the touch driving signals TDS having the same frequency are output. The two or more unit touch sections UTS may be included in a single touch section TS or may be distributed to different touch sections TS.

For example, as illustrated in FIG. 10, the first unit touch section UTS1 and the second unit touch section UTS2 may be distributed to different touch sections TS1 and TS2. That is, the first unit touch section UTS1 may be included in the first touch section TS1 and the second unit touch section UTS2 may be included in the second touch section TS2. As illustrated in FIG. 14, the first unit touch section UTS1 and the second unit touch section UTS2 may be included in a single touch section TS.

As described above, by changing allocation of the unit touch sections UTS which are the section in which the touch electrodes TE are driven using the touch driving signal TDS of a single frequency, it is possible to adjust a period in which the frequency of the touch driving signal TDS is modulated and a length (the section length of a unit touch section UTS) of a section in which the frequency of the touch driving signal TDS is kept constant. Accordingly, it is possible to provide effective multi-frequency driving in consideration of frequency modulation performance or touch sensing performance.

The multi-frequency driving using the frequency modulation by touch sections which has been described with reference to FIGS. 10 to 13 can be applied to the V-sensing method illustrated in FIG. 3 and the H-sensing method illustrated in FIG. 4. The multi-frequency driving using the frequency modulation in a touch section which has been described with reference of FIGS. 14 to 17 can be applied to the V-sensing method illustrated in FIG. 3 and the H-sensing method illustrated in FIG. 4.

Figure 18:
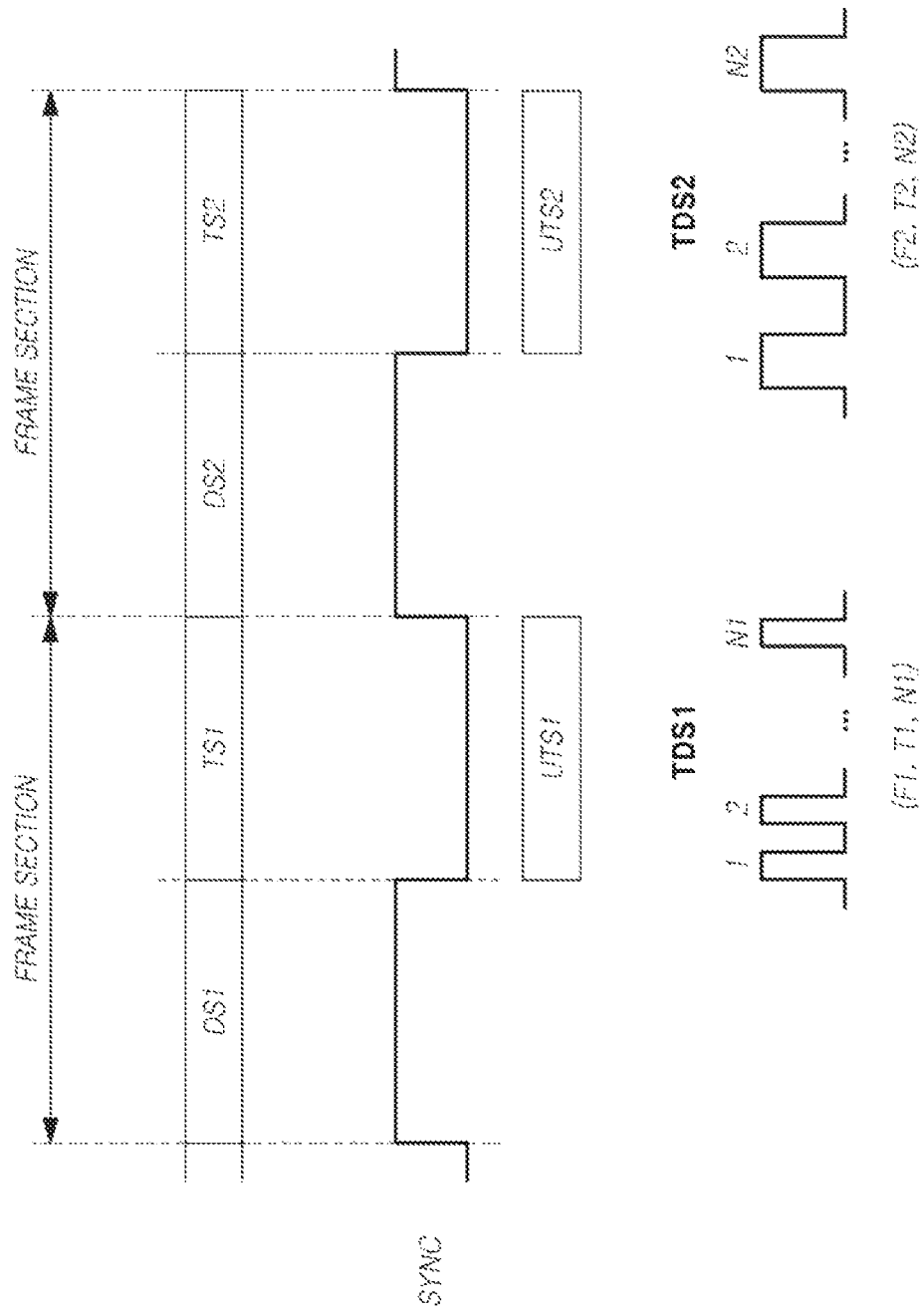
FIGS. 18 and 19 are diagrams illustrating an example in which the touch display device according to embodiments of the present disclosure performs multi-frequency driving using a V-sensing method.
Figure 19:
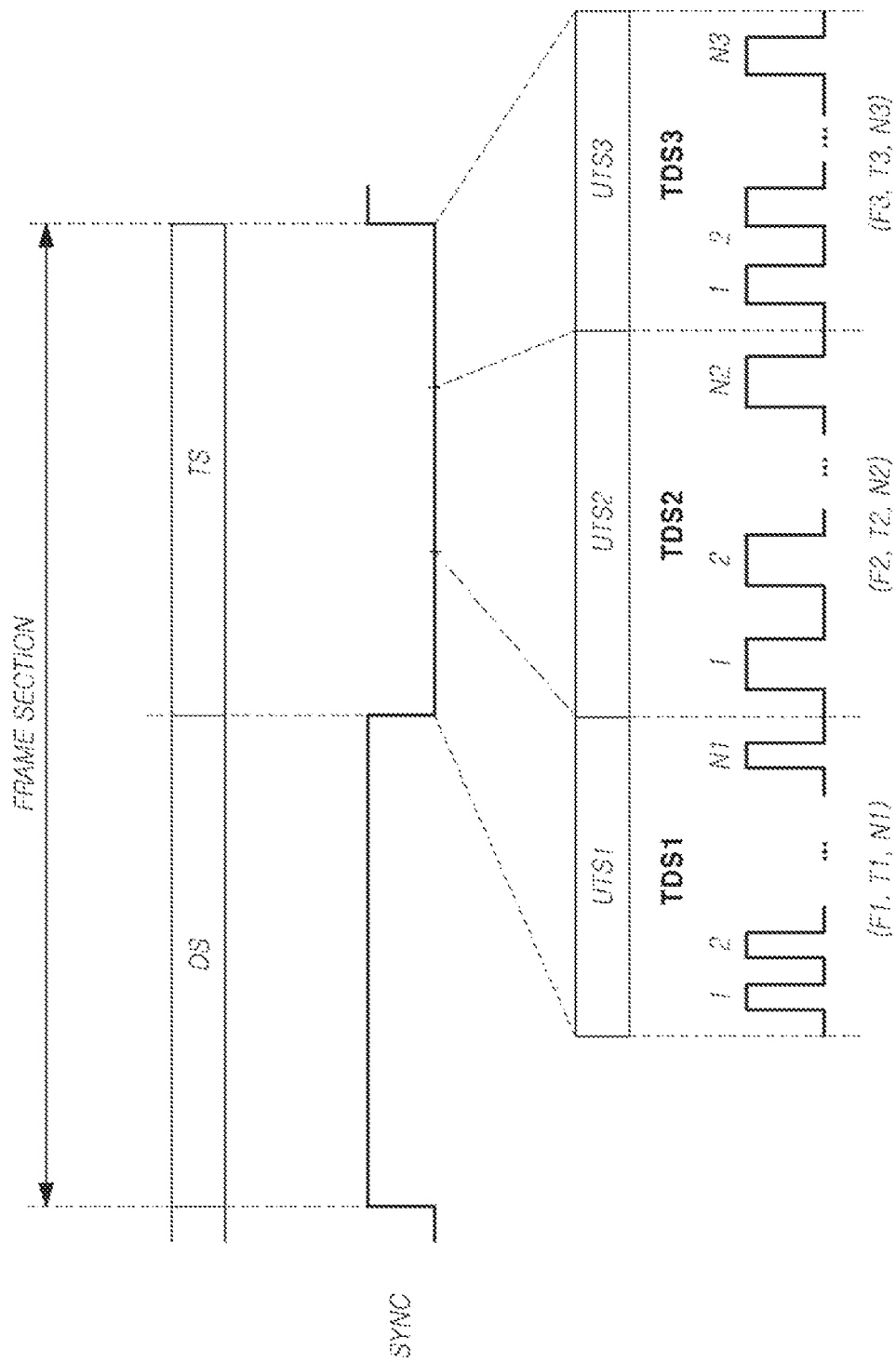

FIG. 18 is a diagram illustrating an example in which the touch display device 100 according to an embodiment of the present disclosure performs the multi-frequency driving using the frequency modulation by touch sections (FIGS. 10 to 13) in the V-sensing method. FIG. 19 is a diagram illustrating an example in which the touch display device 100 according to an embodiment of the present disclosure performs the multi-frequency driving using the frequency modulation in each touch section (FIGS. 14 to 17) in the V-sensing method.

Referring to FIGS. 18 and 19, when the touch driving and the touch sensing are performed using the V-sensing method, one frame section may include one display section DS and one or more touch sections TS. The V-sensing method is also referred to as V-blank driving because the touch driving is performed in a section in which the display driving is not performed. As illustrated in FIG. 18, when one frame section includes one touch section, that is, when the touch sensing circuit 120 modulates the frequency by touch sections to perform the multi-frequency driving in performing the touch driving and the touch sensing using the V-sensing method, two or more unit touch sections UTS1 and UTS2 may be distributed to different touch sections TS1 and TS2.

As illustrated in FIG. 19, when one frame section includes one touch section, that is, when the touch sensing circuit 120 modulates the frequency in each touch section to perform the multi-frequency driving in performing the touch driving and the touch sensing using the V-sensing method, two or more unit touch sections UTS1, UTS2, and UTS3 may be included in one touch section TS. In other words, one touch section included in one frame section is divided into three unit touch sections UTS1, UTS2, and UTS3, the first unit touch section UTS1 in which the touch driving is performed using the touch driving signal TDS1 of the first frequency F1, the second unit touch section UTS2 in which the touch driving is performed using the touch driving signal TDS2 of the second frequency F2, and the third unit touch section UTS3 in which the touch driving is performed using the touch driving signal TDS3 of the third frequency F3 may be present in one touch section TS. Through the multi-frequency driving, the touch display device 100 according to the embodiment of the present disclosure can perform the touch driving and the touch sensing using the V-sensing method in consideration of display performance and touch performance and can achieve EMI suppression effect.

Figure 20:
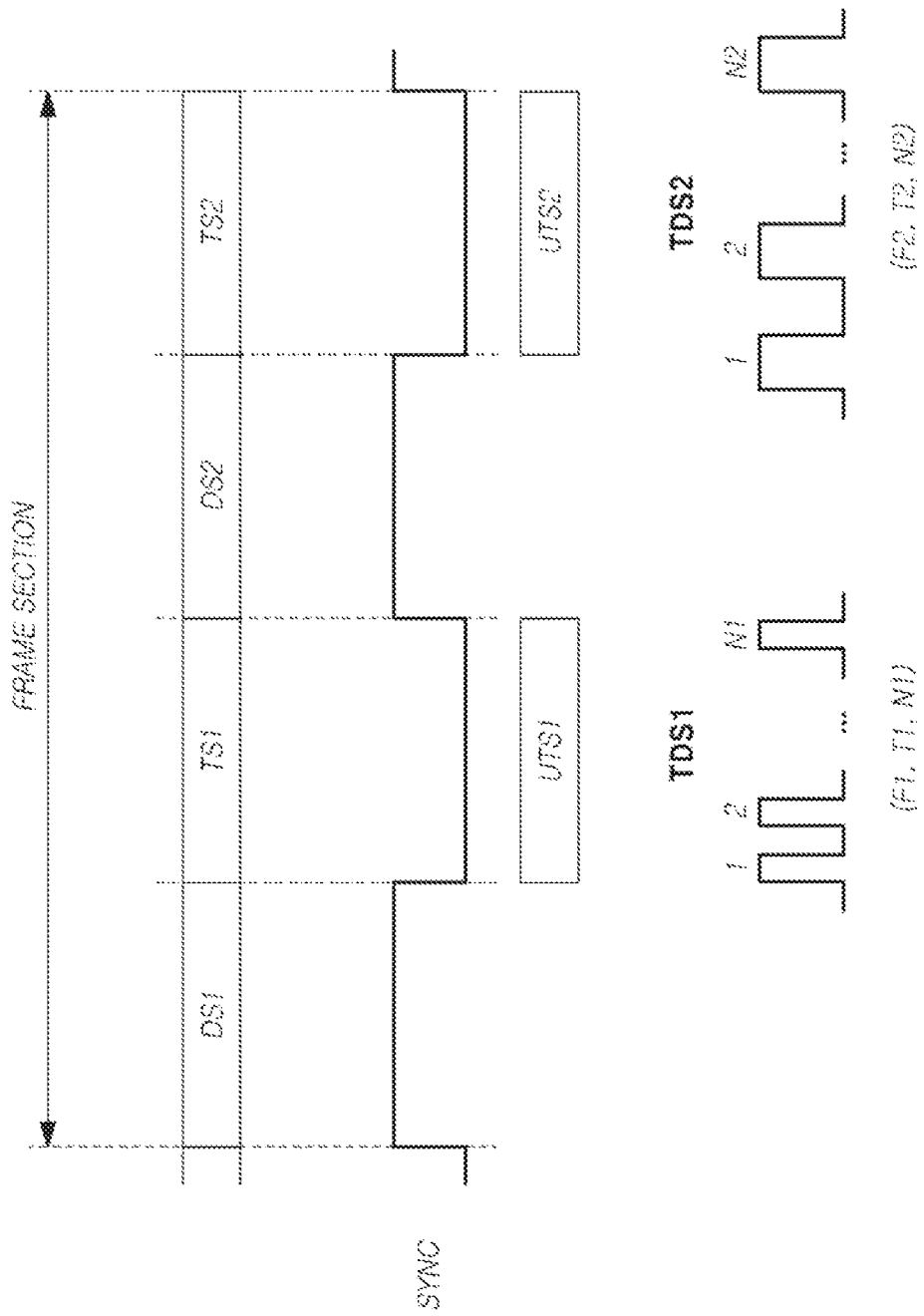
FIGS. 20 and 21 are diagrams illustrating an example in which the touch display device according to embodiments of the present disclosure performs multi-frequency driving using an H-sensing method.
Figure 21:
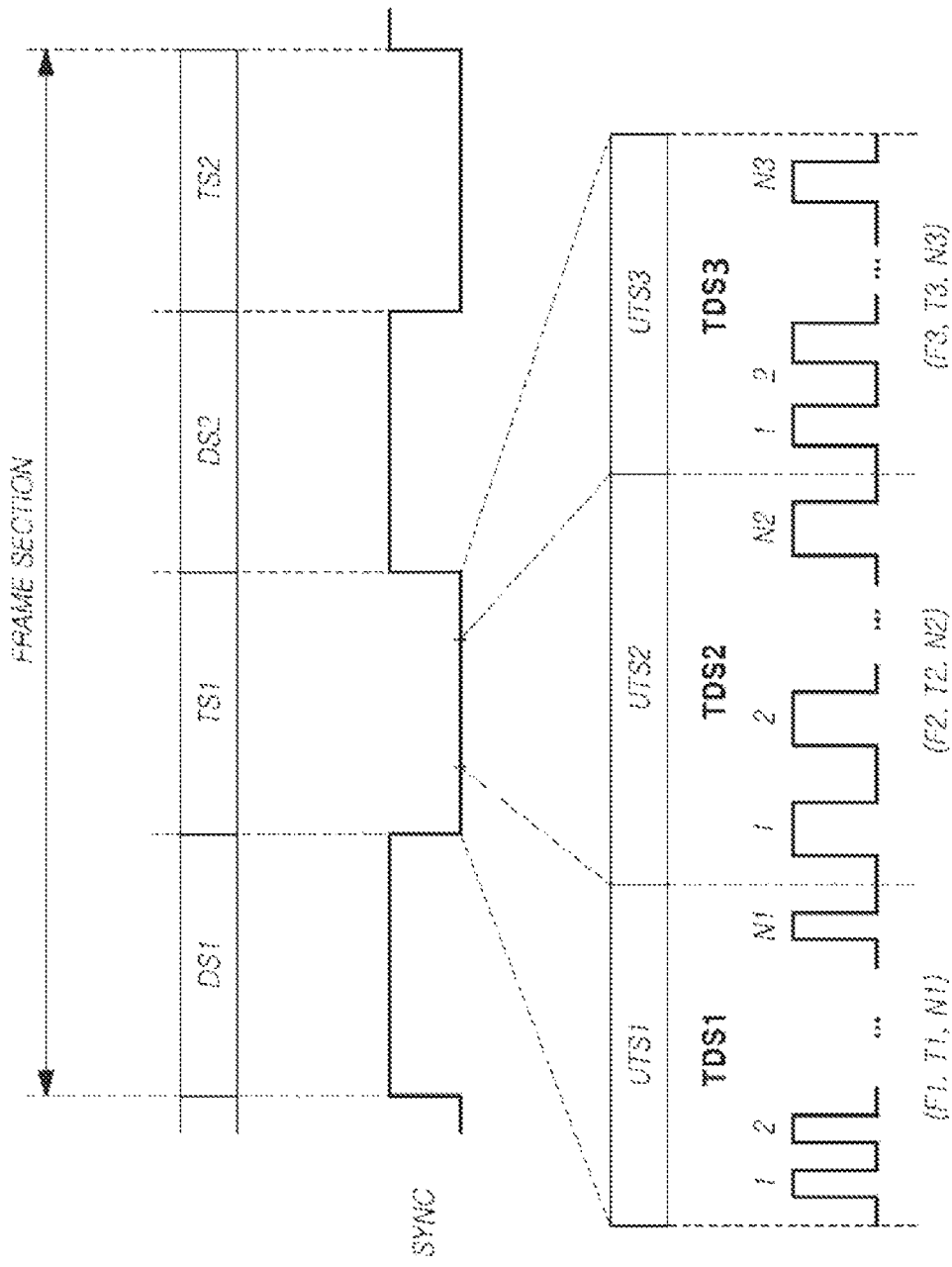

FIGS. 20 and 21 are diagrams illustrating an example in which the touch display device 100 according to embodiments of the present disclosure performs the multi-frequency driving using the H-sensing method. Referring to FIG. 20, when the touch display device 100 according to an embodiment of the present disclosure performs the touch driving and the touch sensing using the H-sensing method, one frame section includes two or more display sections and two or more touch sections. At this time, when the frequency of the touch driving signal TDS is modulated by touch sections TS, two or more unit touch sections UTS1 and UTS2 can be distributed to two or more touch sections TS1 and TS2. Through the multi-frequency driving, the touch display device 100 according to the embodiment of the present disclosure can perform the touch driving and the touch sensing using the H-sensing method in consideration of display performance and touch performance and can achieve EMI suppression effect.

Referring to FIG. 21, when the touch display device 100 according to an embodiment of the present disclosure performs the touch driving and the touch sensing using the H-sensing method, one frame section includes two or more display sections and two or more touch sections. At this time, when the frequency of the touch driving signal TDS is modulated in each touch section TS1, the two or more unit touch sections UTS1, UTS2, and UTS3 may be included in each touch section TS1. Through the multi-frequency driving, the touch display device 100 according to the embodiment of the present disclosure can perform the touch driving and the touch sensing using the H-sensing method in consideration of display performance and touch performance and can further distribute the EMI phenomenon, thereby further suppressing the EMI.

Referring to FIGS. 19 and 21, the two or more unit touch sections UTS1, UTS2, and UTS3 are included in one touch section, the sum (T1+T2+T3) of the section lengths of the two or more unit touch sections UTS1, UTS2, and UTS3 may be equal to or less than the section length of one touch section TS.

As described above, the touch display device 100 according to embodiments of the present disclosure can satisfy conditions of desired display performance and touch performance as a whole and can efficiently provide the multi-frequency driving for EMI suppression.

The method of performing the touch driving based on the above-mentioned multi-frequency driving to sense a touch will be described below. Specific embodiments of the present disclosure of the touch driving method based on the multiple frequencies will be described below in more detail.

Figure 22:
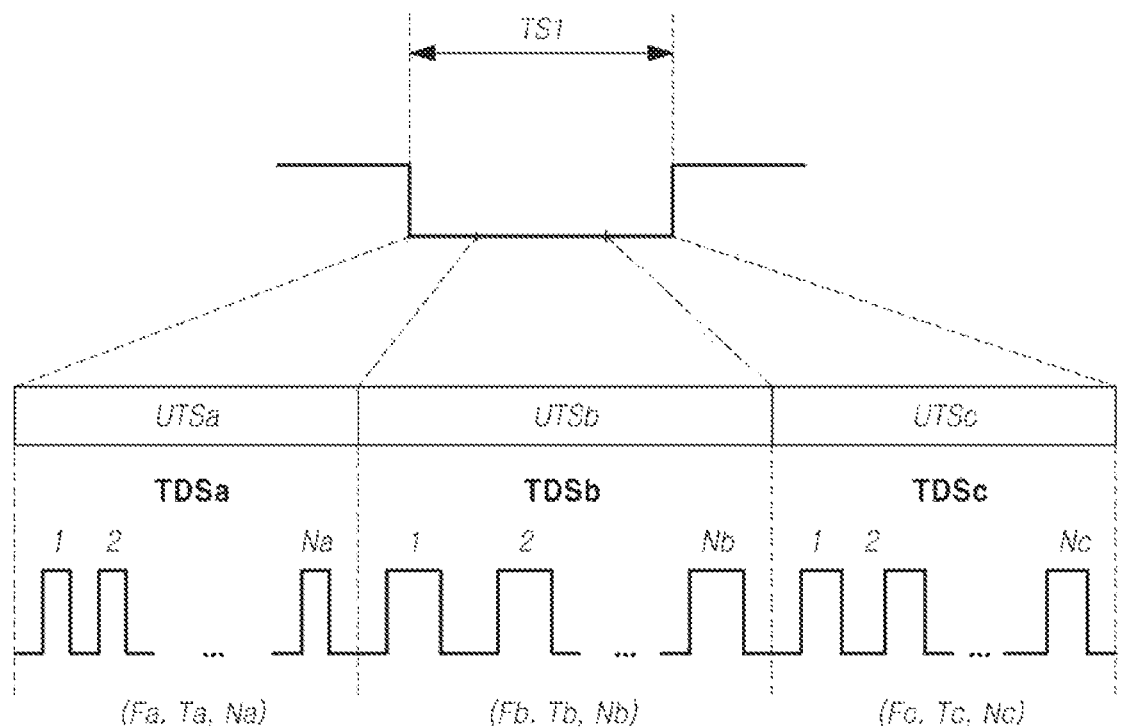
FIGS. 22 and 23 are diagrams illustrating touch driving based on multiple frequencies in the touch display device according to embodiments of the present disclosure.
Figure 23:
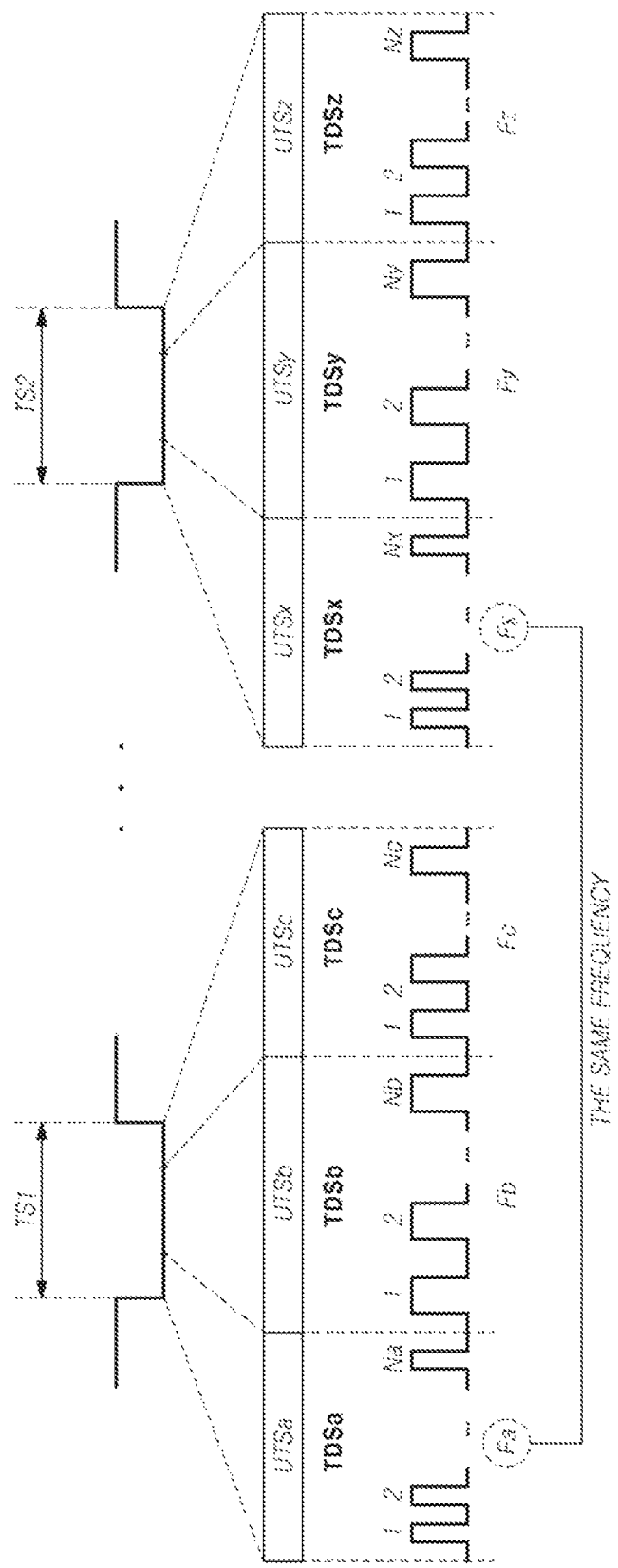

FIGS. 22 and 23 are diagrams illustrating the touch driving based on multiple frequencies of the touch display device according to embodiments of the present disclosure. FIG. 22 illustrates one touch section TS for the touch mode.

Referring to FIG. 22, each touch section TS1 includes two or more unit touch sections UTSa, UTSb, and UTSc. Touch driving signals TDSa, TDSb, and TDSc output from the two or more unit touch sections UTSa, UTSb, and UTSc have constant frequencies Fa, Fb, and Fc. The frequency of the touch driving signal output in at least one unit touch section of the two or more unit touch sections UTSa, UTSb, and UTSc may be different from the frequencies of the touch driving signals output in the other unit touch sections.

According to the touch driving based on multiple frequencies, at least one of the frequencies Fa, Fb, and Fc of the touch driving signals TDSa, TDSb, and TDSc output from the touch sensing circuit 120 in one touch section TS1 is modulated differently, the EMI phenomenon occurring in the touch driving may be suppressed by the effective distribution of the EMI components. Each of the frequencies Fa, Fb, and Fc of the touch driving signals TDSa, TDSb, and TDSc output in the two or more unit touch sections UTSa, UTSb, and UTSc can be defined by the section length of the corresponding unit touch section and the number of pulses of the touch driving signal in the corresponding unit touch section.

As described above, the touch display device 100 according to the embodiments of the present disclosure provides two frequency modulation techniques to make the frequency of the touch driving signal output in at least one unit touch section of the two or more unit touch sections UTSa, UTSb, and UTSc different from the frequencies of the touch driving signals output in the other unit touch sections. The two frequency modulation techniques include a first technique of modulating the frequency by adjusting the number of pulses of a touch driving signal and a second technique of modulating the frequency by adjusting a section length of a unit touch section.

According to the first frequency modulation technique, the section lengths Ta, Tb, and Tc of the two or more unit touch sections UTSa, UTSb, and UTSc may be equal to each other and the numbers of pulses Na, Nb, and Nc of the touch driving signals TDSa, TDSb, and TDSc in the two or more unit touch sections UTSa, UTSb, and UTSc may be different from each other. According to the second frequency modulation technique, the section lengths Ta, Tb, and Tc of the two or more unit touch sections UTSa, UTSb, and UTSc may be different from each other and the numbers of pulses Na, Nb, and Nc of the touch driving signals TDSa, TDSb, and TDSc in the two or more unit touch sections UTSa, UTSb, and UTSc may be equal to each other. The sum of the section lengths Ta, Tb, and Tc of the two or more unit touch sections UTSa, UTSb, and UTSc may be equal to or less than the section length of one touch section TS1.

FIG. 23 illustrates two touch sections TS1 and TS2 for the touch mode. Two touch sections TS1 and TS2 are temporally separated from each other and at least one display section may be present therebetween. Referring to FIG. 23, similarly to the first touch section TS1, the second touch section TS2 includes two or more unit touch sections UTSx, UTSy, and UTSz which are continuous.

Touch driving signals TDSx, TDSy, and TDSz output in the two or more unit touch sections UTSx, UTSy, and UTSz have constant frequencies Fx, Fy, and Fz. The frequency of the touch driving signal output in at least one unit touch section of the two or more unit touch sections UTSx, UTSy, and UTSz may be different from the frequencies of the touch driving signals output in the other unit touch sections.

Referring to FIG. 23, m1 frequencies Fa, Fb, and Fc which are sequentially used in the first touch section TS1 and m2 frequencies Fx, Fy, and Fz which are sequentially used in the second touch section TS2 may be equal to each other, or at least one pair thereof may be different from each other. Here, m1 is a natural number equal to or greater than 2 and equal to or less than the number of unit touch sections k, and m2 is a natural number equal to or greater than 2 and equal to or less than the number of unit touch sections k. Here, m1 and m2 may be equal to each other or may be different from each other. That is, when Fa and Fx form a pair, Fb and Fy form a pair, and Fc and Fz form a pair, two frequencies forming each pair may be equal to each other (Fa=Fx, Fb=Fy, and Fc=Fz). On the other hand, two frequencies of at least one pair of three pairs may be different from each other. For example, Fa=Fx, Fb≠Fy, and Fc=Fz, Fa=Fx, Fb=Fy, and Fc≠Fz, Fa=Fx, Fb≠Fy, and Fc≠Fz, or Fa≠Fx, Fb≠Fy, and Fc≠Fz may be satisfied. According to the above description, frequencies in different touch sections TS1 and TS2 may be modulated variously to achieve an EMI suppression effect.

As illustrated in FIG. 23, the frequency Fa of the first touch driving signal TDSa output in the first unit touch section UTSa of the first touch section and the frequency Fx of the touch driving signal TDSx output in the first unit touch section UTSx of the second touch section TS2 may be equal to each other (Fa=Fx). In this way, by making the frequencies first used in the touch sections equal to each other, the frequency can be efficiently modulated in each touch section with respect to the first-used frequency.

Figure 24:
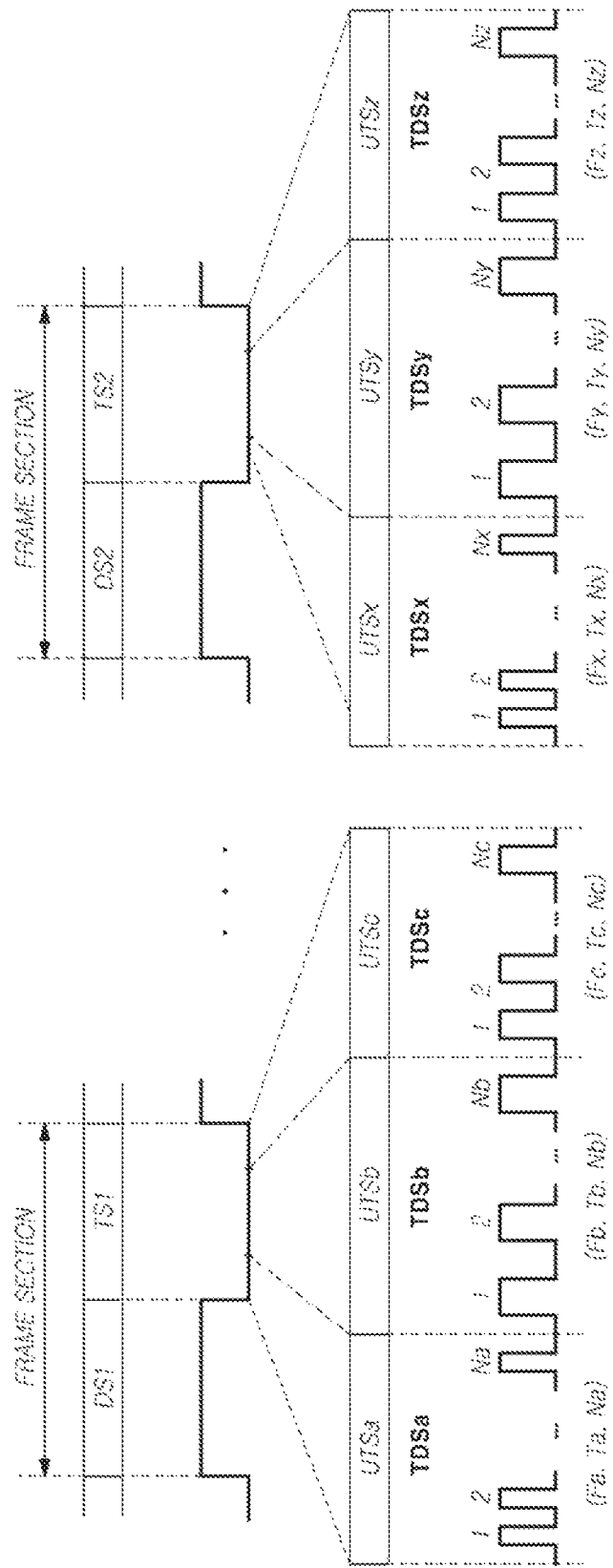
FIG. 24 is a diagram illustrating touch driving based on multiple frequencies using a V-sensing method in the touch display device according to an embodiment of the present disclosure.
Figure 25:
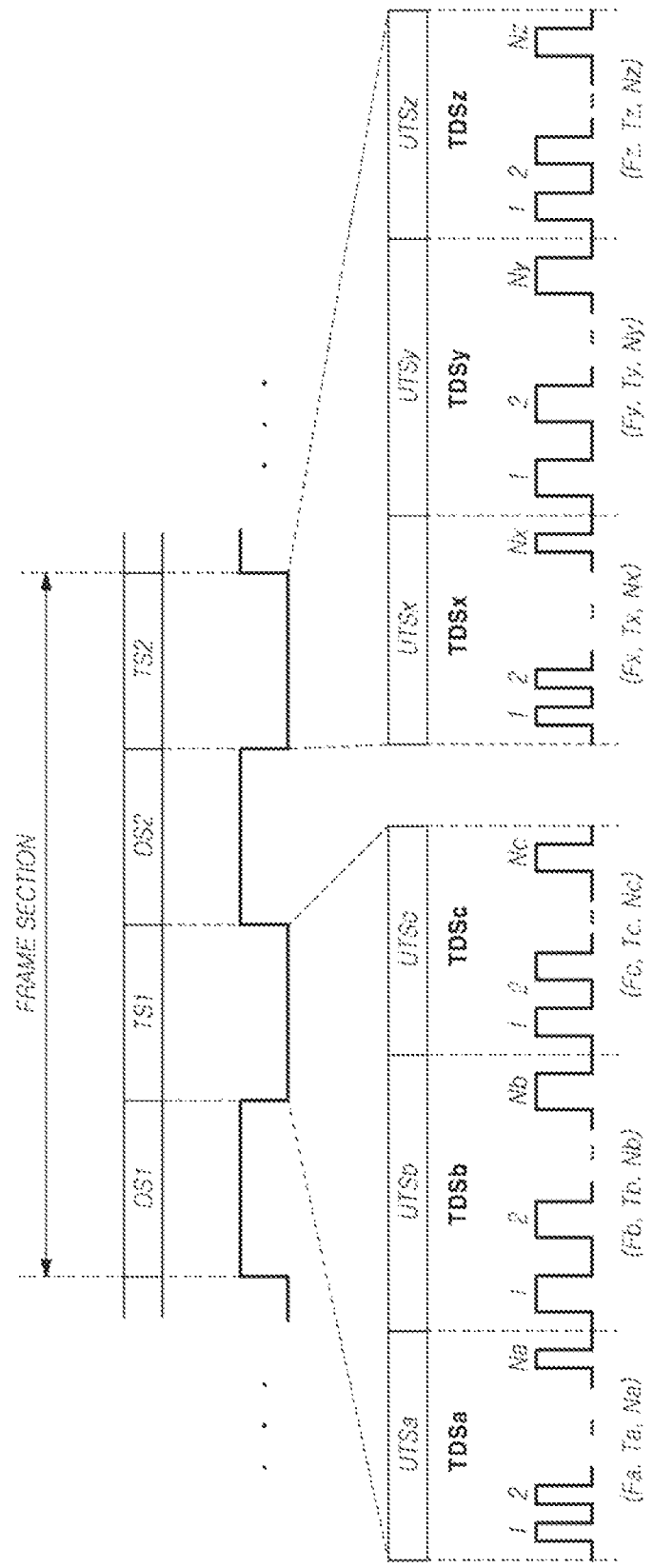
FIGS. 25 and 26 are diagrams illustrating touch driving based on multiple frequencies using an H-sensing method in the touch display device according to embodiments of the present disclosure.
Figure 26:
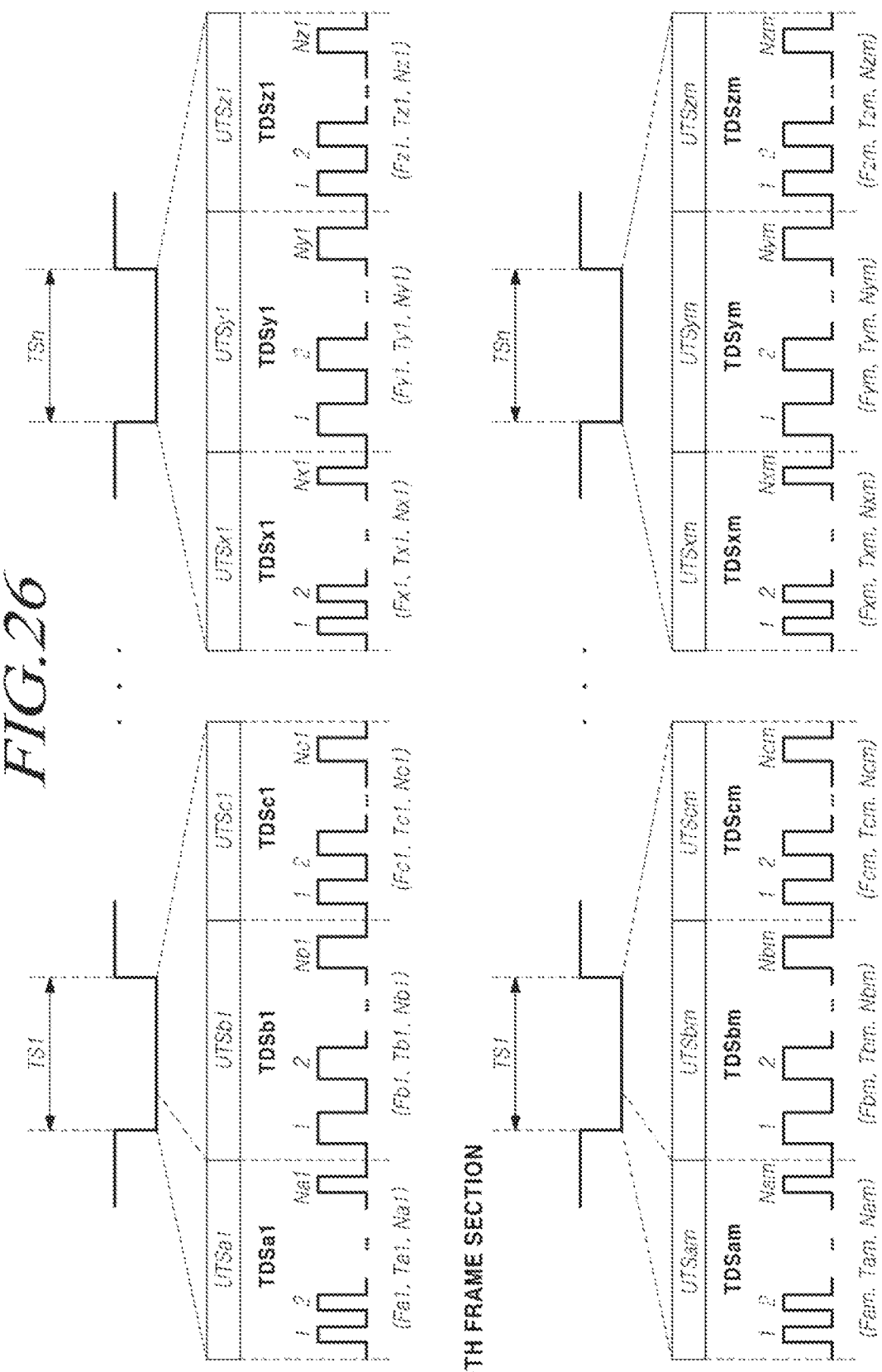

FIG. 24 is a diagram illustrating the touch driving based on multiple frequencies using the V-sensing method in the touch display device 100 according to an embodiment of the present disclosure. FIGS. 25 and 26 are diagrams illustrating the touch driving based on multiple frequencies using the H-sensing method in the touch display device 100 according to embodiments of the present disclosure.

Referring to FIGS. 24 and 25, the display sections DS1 and DS2 for the display mode and the touch sections TS1 and TS2 for the touch mode are temporally separated from each other. When the V-sensing method is used to sense a touch as illustrated in FIG. 24, one frame section includes one display section DS1 and one touch section TS1. When the H-sensing method is used to sense a touch as illustrated in FIG. 25, one frame section includes two or more display sections DS1 and DS2 and one or more touch sections TS1 and TS2. Even when any of the V-sensing method and the H-sensing method is used to sense a touch in consideration of display performance and touch performance, the touch driving method based on multiple frequencies for the EMI suppression can be applied.

FIG. 25 illustrates an example in which two display sections DS1 and DS2 and two touch sections TS1 and TS2 are allocated to one frame section. FIG. 26 illustrates generalization of such allocation.

Referring to FIG. 26, each frame section from a first frame section to an m-th frame section includes n touch sections TS1, . . . , TSn. In the first frame section, the first touch section TS1 of the n touch sections TS1, . . . , TSn may include two or more unit touch section UTSa1, UTSb1, and UTSc1. Here, at least one of frequencies Fa1, Fb1, and Fc1 of touch driving signals TDSa1, TDSb1, and TDSc1 output in the two or more unit touch section UTSa1, UTSb1, and UTSa1 may be different from the other ones through a frequency modulating process.

The frequency modulating process can be performed by adjusting section lengths Ta1, Tb1, and Tc1 of the two or more unit touch section UTSa1, UTSb1, and UTSc1 or adjusting the numbers of pulses Na1, Nb1, and Nc1 of the touch driving signals TDSa1, TDSb1, and TDSc1 output in the two or more unit touch section UTSa1, UTSb1, and UTSc1. In the first frame section, the n-th touch section TSn of the n touch sections TS1, . . . , TSn may include two or more unit touch section UTSx1, UTSy1, and UTSz1. Here, at least one of frequencies Fx1, Fy1, and Fz1 of touch driving signals TDSx1, TDSy1, and TDSz1 output in the two or more unit touch section UTSx1, UTSy1, and UTSz1 may be different from the other ones through a frequency modulating process.

The frequency modulating process can be performed by adjusting section lengths Tx1, Ty1, and Tz1 of the two or more unit touch section UTSx1, UTSy1, and UTSz1 or adjusting the numbers of pulses Nx1, Ny1, and Nz1 of the touch driving signals TDSx1, TDSy1, and TDSz1 output in the two or more unit touch section UTSx1, UTSy1, and UTSz1.

In the m-th frame section, the first touch section TS1 of the n touch sections TS1, . . . , TSn may include two or more unit touch section UTSam, UTSbm, and UTScm. Here, at least one of frequencies Fam, Fbm, and Fcm of touch driving signals TDSam, TDSbm, and TDScm output in the two or more unit touch section UTSam, UTSbm, and UTScm may be different from the other ones through a frequency modulating process.

The frequency modulating process can be performed by adjusting section lengths Tam, Tbm, and Tcm of the two or more unit touch section UTSam, UTSbm, and UTScm or adjusting the numbers of pulses Nam, Nbm, and Ncm of the touch driving signals TDSam, TDSbm, and TDScm output in the two or more unit touch section UTSam, UTSbm, and UTScm.

In the m-th frame section, the n-th touch section TSn of the n touch sections TS1, . . . , TSn may include two or more unit touch section UTSxm, UTSym, and UTSzm. Here, at least one of frequencies Fxm, Fym, and Fzm of touch driving signals TDSxm, TDSym, and TDSzm output in the two or more unit touch section UTSxm, UTSym, and UTSzm may be different from the other ones through a frequency modulating process.

The frequency modulating process can be performed by adjusting section lengths Txm, Tym, and Tzm of the two or more unit touch section UTSxm, UTSym, and UTSzm or adjusting the numbers of pulses Nxm, Nym, and Nzm of the touch driving signals TDSxm, TDSym, and TDSzm output in the two or more unit touch section UTSxm, UTSym, and UTSzm.

Figure 27:
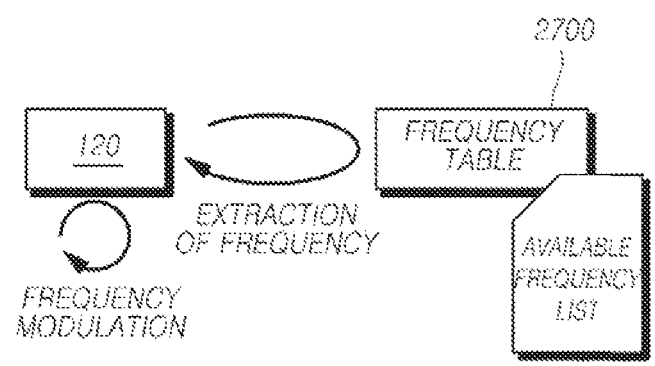
FIG. 27 is a diagram illustrating a frequency modulating method for touch driving based on multiple frequencies in the touch display device according to an embodiment of the present disclosure.

FIG. 27 is a diagram illustrating the frequency modulating method for the touch driving based on multiple frequencies in the touch display device 100 according to an embodiment of the present disclosure. Referring to FIG. 27, the touch display device 100 according to an embodiment of the present disclosure can perform the touch driving based on multiple frequencies for sensing a touch and perform a process of modulating a frequency of a touch driving signal. For the frequency modulating process, the touch display device 100 according to embodiments of the present disclosure may further include a frequency table 2700 that stores available frequencies. The frequency table 2700 stores an available frequency list including available frequencies to which a frequency can be modulated for the frequency modulating process.

The available frequency list stored in the frequency table 2700 may be organized by touch sections or by unit touch sections. The touch sensing circuit 120 modulates a frequency of a touch driving signal with reference to the frequency table 2700. Accordingly, the frequencies of the touch driving signals output in two or more unit touch sections of each touch section may be frequencies extracted from the available frequencies stored in the frequency table 2700.

As described above, by setting the available frequency list which can be used for frequency modulation in the frequency table 2700 in advance and determining a modulated frequency on the basis of thereof, the touch display device 100 according to an embodiment of the present disclosure can rapidly perform the frequency modulating process. When the frequencies of the touch driving signals output in two or more unit touch sections are modulated, the modulated frequencies may be sequentially or randomly extracted from the available frequency list stored in the frequency table 2700 for modulation. When the available frequencies in the available frequency list stored in the frequency table 2700 are sequentially selected and used for the frequency modulating process, the modulated frequencies can be rapidly determined.

For the EMI suppression, the available frequencies in the available frequency list should be arranged such that the interval between neighboring frequencies in the sequence is equal to or greater than a predetermined interval. When one touch section includes three or more unit touch sections, the frequencies of the three or more unit touch sections in one touch section can be changed with a constant magnitude. When one frequency of the available frequencies in the available frequency list stored in the frequency table 2700 is arbitrarily selected and used for the frequency modulating process, there is a high possibility that the arbitrarily selected frequencies will be different from each other, which can help the EMI suppression. As described above, the frequencies modulated in the frequency modulating process using the frequency table 2700 should be determined to help the EMI suppression.

Figure 29:
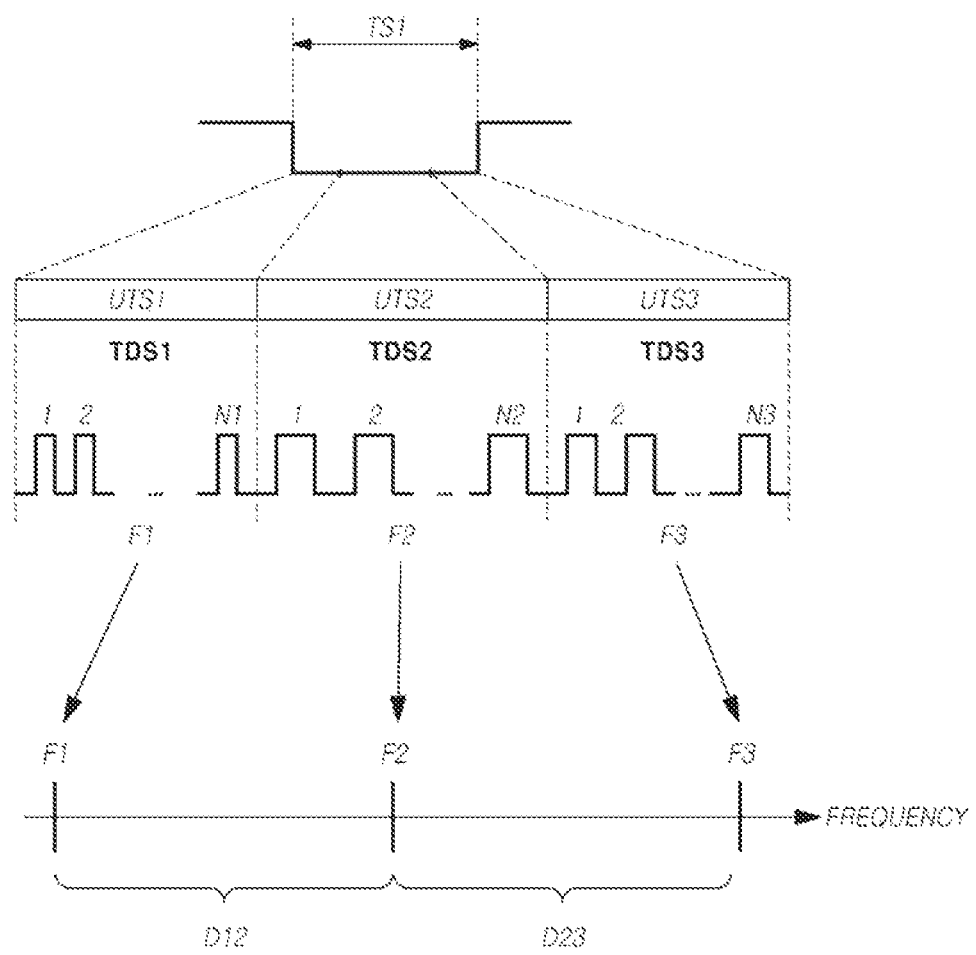
FIG. 29 is a diagram illustrating frequency modulation characteristics for touch driving based on multiple frequencies in the touch display device according to an embodiment of the present disclosure.

Accordingly, as illustrated in FIG. 29 which illustrates frequency modulation characteristics for the touch driving based on multiple frequencies, m (where m is a natural number equal to or greater than 2, m=3 in this example) frequencies F1, F2, and F3 which are used in one touch section TS should be extracted from the available frequency list stored in the frequency table 2700 such that the frequency intervals D12 and D23 are equal to or greater than a predetermined interval. In order to enhance the EMI suppression effect, the frequency modulating process should be performed such that the frequency intervals between the two or more frequencies F1, F2, and F3 used in one touch section TS are maximized. In this way, by modulating the frequencies such that the frequency intervals are maximized with reference to the available frequency list stored in advance in the frequency table 2700, it is possible to remarkably decrease an EMI occurrence possibility and a degree of EMI occurrence.

As another frequency modulating method, the frequency modulating process may be performed using a frequency hopping technique using a noise measurement result. In this regard, the touch sensing circuit 120 can modulate a frequency of a touch driving signal TDS to a frequency in which noise is avoided on the basis of the noise measurement result. Here, the noise measurement result may be information which is output from a noise measuring device mounted inside the touch display device 100 and is input to the touch sensing circuit 120 or may be information which is input to the touch display device 100 from an external noise measuring device.

A specific method of changing a frequency of a touch driving signal TDS to a noise-avoided frequency will be described below. A noise-inducing frequency, which is confirmed to be a frequency in which noise is induced on the basis of the noise measurement result, is removed from a preset available frequency list or a preset available frequency range. Then, when the frequency of the touch driving signal TDS is changed with reference to the available frequency list from which the noise-inducing frequency is removed or the available frequency range from which the noise-inducing frequency is removed, a frequency other than the noise-inducing frequency is selected and set as a modulated frequency of the touch driving signal TDS.

On the other hand, the noise-inducing frequency may be removed from the available frequency list or the available frequency range for a predetermined time and then may be included therein again, or may be removed from the available frequency list or the available frequency range from a time point at which the noise measurement result is acquired to a time point at which a power supply is turned off and then may be included in the available frequency list or the available frequency range when the power supply is turned on. Alternatively, the noise-inducing frequency may be removed from the available frequency list or the available frequency range and then may be included in the available frequency list or the available frequency range again when it is confirmed to be a frequency not inducing noise on the basis of a next-input noise measurement result. On the other hand, the noise can be measured by sensing voltages of the touch electrodes TE in the display panel 110 in a period (a noise measurement period) other than the touch sensing period (including the touch section).

Figure 28:
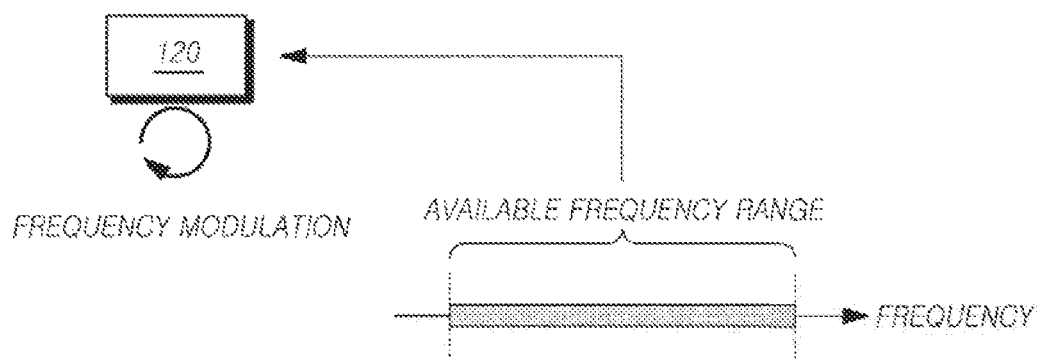
FIG. 28 is a diagram illustrating another frequency modulating method for touch driving based on multiple frequencies in the touch display device according to an embodiment of the present disclosure.

FIG. 28 is a diagram illustrating another frequency modulating method for the touch driving based on multiple frequencies in the touch display device 100 according to an embodiment of the present disclosure. Referring to FIG. 28, in the frequency modulating process, the touch display device 100 according to the embodiment of the present disclosure can preset a range of available frequencies (an available frequency range) and determine a modulated frequency within the preset available frequency range. Accordingly, a frequency of a touch driving signal output in each of two or more unit touch sections can be determined in the preset available frequency range. According to the above-mentioned method, by freely determining a modulated frequency within the available frequency range, it is possible to enhance randomness of the modulated frequency and thus to further enhance the EMI suppression effect.

On the other hand, as illustrated in FIG. 29, two or more frequencies F1, F2, and F3 which are used in one touch section TS can be extracted from the available frequency range such that the frequency interval is equal to or greater than a predetermined interval. In order to maximize the EMI suppression effect, a frequency should be selected from the available frequency range and be subjected to the frequency modulating process, so as to maximize the frequency interval between the two or more frequencies F1, F2, and F3 which are used in one touch section TS. In this way, by determining and modulating a frequency in the preset available frequency range so as to maximize the frequency interval, it is possible to remarkably decrease an EMI occurrence possibility and a degree of EMI occurrence.

Figure 30:
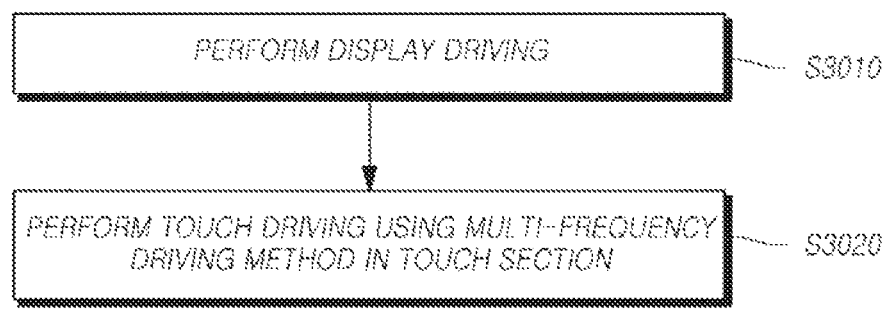
FIG. 30 is a flowchart illustrating a driving method of the touch display device according to an embodiment of the present disclosure.

The driving method of the touch display device 100 according to an embodiment of the present disclosure will be described below. FIG. 30 is a flowchart illustrating the driving method of the touch display device 100 according to an embodiment of the present disclosure.

Referring to FIG. 30, the touch display device 100 according to the embodiment of the present disclosure includes a display panel in which plural data lines and plural gate lines are arranged and plural sub pixels defined by the data lines and the gate lines are arranged and has two operation modes of a display mode for displaying an image and a touch mode for sensing a touch. Accordingly, a driving method for these two operation modes can be provided.

Referring to FIG. 30, the driving method of the touch display device 100 according to the embodiment of the present disclosure includes a display driving step S3010 of driving the data lines and the gate lines in a display section for the display mode and a touch driving step S3020 of outputting a touch driving signal of a pulse type for driving at least one of plural touch electrodes arranged inside or outside the display panel in a touch section for the touch mode. The display driving step S3010 and the touch driving step S3020 may be reversed in the order and may be repeatedly performed. On the other hand, one touch section may include two or more continuous unit touch sections. The touch driving signals output in the two or more unit touch sections may have a constant frequency. The frequency of the touch driving signal output in at least one unit touch section of the two or more unit touch sections may be different from the frequency of the touch driving signal output in the other unit touch sections.

According to the above-mentioned driving method, in the touch driving, at least one of the frequencies of the touch driving signals output from the touch electrode in one touch section can be modulated to have a different value by performing the touch driving based on multiple frequencies, whereby an EMI charge share phenomenon occurs and the EMI phenomenon occurring due to the touch driving can be suppressed.

Figure 31:
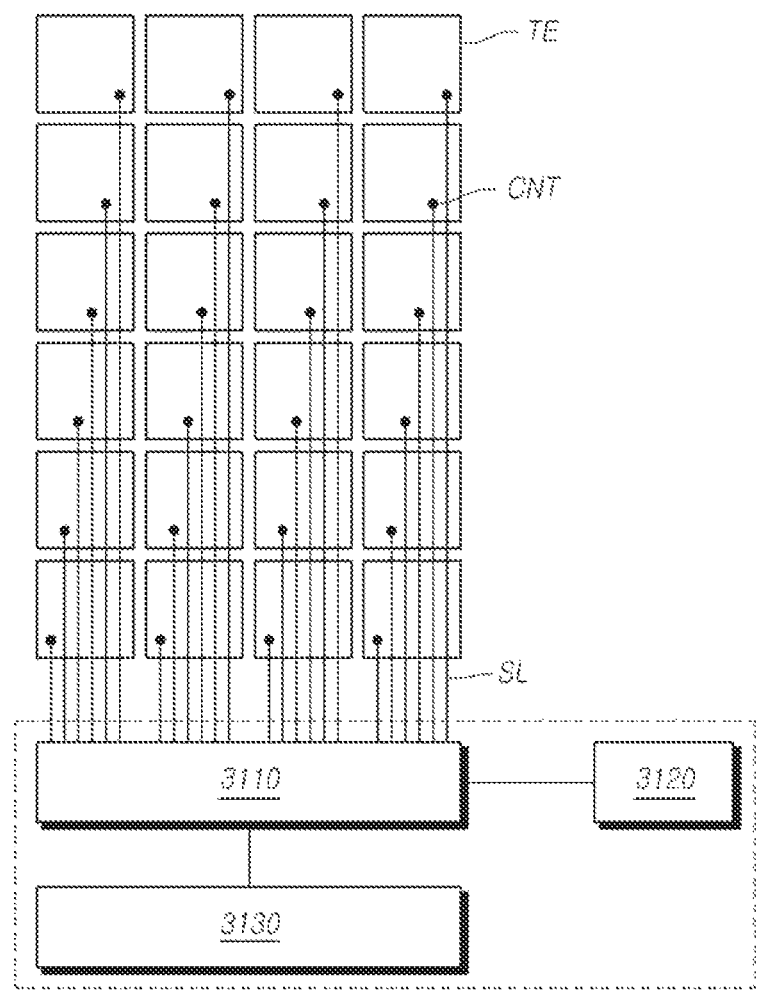
FIGS. 31 and 32 are diagrams illustrating a touch sensing circuit of the touch display device according to embodiments of the present disclosure.
Figure 32:
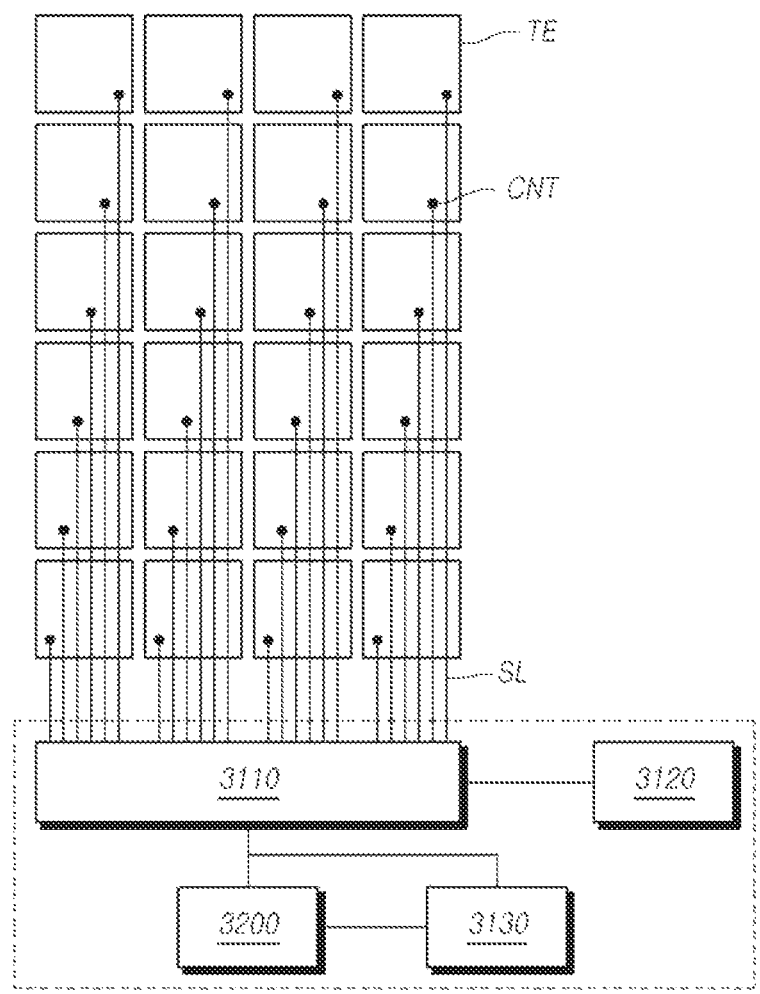

The touch sensing circuit 120 for performing the touch driving based on multiple frequencies will be described below. FIGS. 31 and 32 are diagrams illustrating the touch sensing circuit 120 of the touch display device 100 according to embodiments of the present disclosure.

Referring to FIGS. 31 and 32, the touch sensing circuit 120 is a circuit for sensing a touch in the touch display device 100 having two operation modes including the display mode for displaying an image and the touch mode for sensing a touch. Referring to FIGS. 31 and 32, the touch sensing circuit 120 includes a driving circuit 3110 that outputs a touch driving signal of a pulse type for driving at least one of plural touch electrodes TE and a sensing circuit 3120 that detects a capacitance variation in each of the touch electrodes TE to sense a touch or a touch position. The driving circuit 3110 is electrically connected to the touch electrodes TE via signal lines SL. Here, the touch electrodes TE can be connected to the signal lines SL located in a different layer via contact holes CNT. The driving circuit 3110 performs the touch driving based on waveform modulation. Each touch section for the touch mode may include two or more continuous unit touch sections. The touch driving signals output in the two or more unit touch sections may have a constant frequency. The frequency of the touch driving signal output in at least one unit touch section of the two or more unit touch sections may be different from the frequency of the touch driving signal output in another unit touch section. It is possible to achieve an EMI suppression effect by the touch driving based on multiple frequencies using the touch sensing circuit 120.

Referring to FIG. 31, the touch sensing circuit 120 may further include a signal generating circuit 3130 that generates a touch driving signal having two or more frequencies through a frequency modulating process. As described above, since only one signal generating circuit 3130 can be used to generate the touch driving signals TDS of frequencies and to perform the multi-frequency driving, it is possible to reduce the number of signal generating elements.

Referring to FIG. 32, the touch sensing circuit 120 may further include a signal generating circuit 3130 that generates a touch driving signal of one frequency of two or more frequencies and a signal converting circuit 3200 that converts the touch driving signal generated by the signal generating circuit 3130 into a touch driving signal of another frequency. As described above, since the signal generating circuit 3130 generates a touch driving signal of one frequency (a reference frequency) and the signal converting circuit 3200 generates a touch driving signal of another frequency to perform the multi-frequency driving, the number of signal generating elements can increase but the existing signal generating circuit 3130 using only a single frequency can be continuously used by adding only the signal converting circuit 3200.

The driving circuit 3110, the sensing circuit 3120, the signal generating circuit 3130, and the signal converting circuit 3200 can be embodied by separate integrated circuits or separate components. In this case, the signal generating circuit 3130 can be embodied by a power integrated circuit.

The driving circuit 3110 can be embodied by a read-out IC including a multiplexer, an integrator, an analog-to-digital converter, and the like, and can output a common voltage to the touch electrodes TE in the display section and output a touch driving signal TDS to the touch electrodes TE in the touch section. The driving circuit 3110 may be embodied by a combined IC including a functional unit of the read-out IC and a data driving unit for driving the data lines DL. The sensing circuit 3120 can be embodied by a micro control unit (MCU). The signal converting circuit 3200 can be embodied by a frequency converter.

On the other hand, two or more of the driving circuit 3110, the sensing circuit 3120, the signal generating circuit 3130, and the signal converting circuit 3200 may be embodied to be included in one IC. For example, the signal generating circuit 3130 and the driving circuit 3110 may be embodied to be included in one IC or one component. For example, the signal generating circuit 3130, the driving circuit 3110, and the sensing circuit 3120 may be embodied to be included in one IC or one component. As described above, by embodying the touch sensing circuit 120 using several ICs or components, a touch sensing circuit 120 suitable for a middle-size or large-size display device, a small-size display device, or a mobile device can be embodied.

Figure 33:
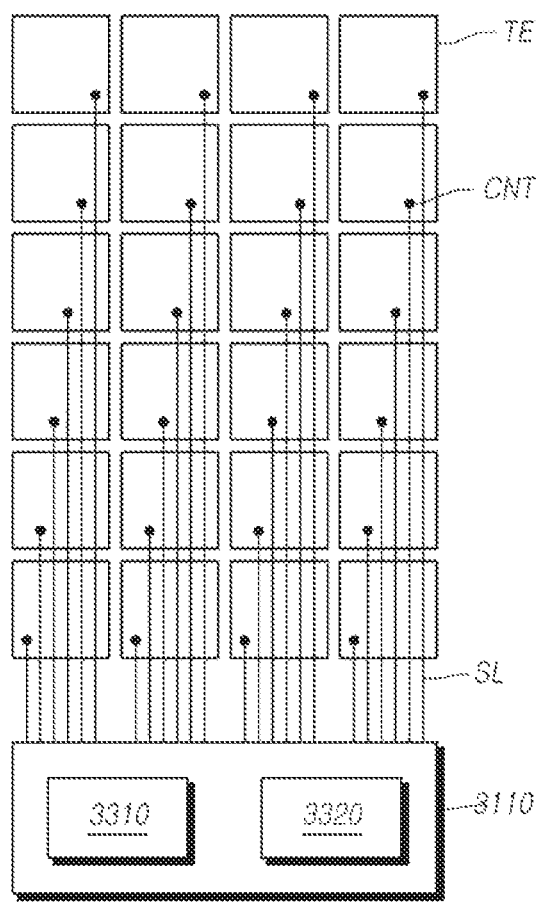
FIG. 33 is a diagram illustrating a driving circuit of the touch sensing circuit of the touch display device according to an embodiment of the present disclosure.

FIG. 33 is a diagram illustrating the driving circuit 3110 of the touch sensing circuit 120 of the touch display device 100 according to an embodiment of the present disclosure. Referring to FIG. 33, the driving circuit 3110 according to the embodiment of the present disclosure includes a signal output unit 3310 that outputs a touch driving signal of a pulse type for driving at least one of plural touch electrodes for sensing a touch and a signal detecting unit 3320 that detects a signal for sensing a touch from the touch electrode supplied with the touch driving signal.

The signal detected by the signal detecting unit 3320 is transmitted to the sensing circuit 3120 and is used to sense a touch. The driving circuit 3110 is a circuit that performs the touch driving based on multiple frequencies. Each touch section for the touch mode may include two or more continuous unit touch sections. The touch driving signals output in the two or more unit touch sections may have a constant frequency. The frequency of the touch driving signal output in at least one unit touch section of the two or more unit touch sections may be different from the frequency of the touch driving signal output in another unit touch section. It is possible to achieve an EMI suppression effect by the touch driving based on multiple frequencies using the touch sensing circuit 120.

The driving circuit 3110 can include a multiplexer, an integrator, an analog-to-digital converter, and an analog front end (AFE) and can perform a signal output function and a signal detecting function. The driving circuit 3110 can be embodied by a read-out IC. The driving circuit 3110 can output a common voltage for the display driving to the touch electrodes TE in the display section and output a touch driving signal TDS to at least one touch electrode TE in the touch section. The driving circuit 3110 may be embodied by a combined IC including a functional unit of the read-out IC and a data driving unit for driving the data lines DL.

Figure 34:
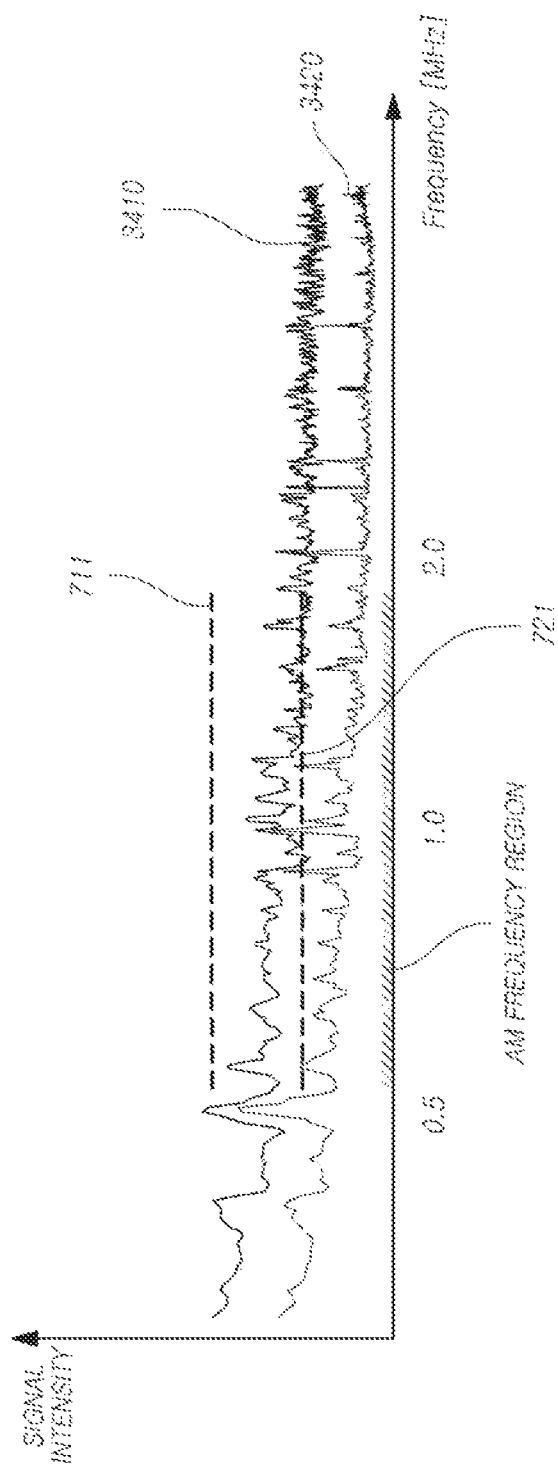
FIG. 34 is a diagram illustrating an EMI suppression effect in the touch display device according to an embodiment of the present disclosure.

FIG. 34 is a diagram illustrating an EMI suppression effect of the touch display device 100 according to an embodiment of the present disclosure. Referring to FIG. 34, when the touch electrodes TE of the touch display device 100 are driven using the touch driving signal TDS having a single frequency of 100 KHz, it can be seen that EMI generated in an amplitude modulation (AM) frequency region (for example, about 500 KHz to about 1,605 KHz) is removed by the multi-frequency driving.

FIG. 34 is a graph which is obtained by measuring signal intensity of an EMI signal by frequencies and in which an upper-limit measured value 3410 and an average measured value 3420 of EMI signals are arranged by frequencies. As the measurement result, it can be seen that positions (712 in FIG. 7, corresponding to EMI) at which the upper-limit measured value 3410 of the EMI signal is greater than a upper-limit reference value 711 which is a minimum upper limit value for satisfying an EMI condition in the AM frequency region are removed.

As the measurement result, it can be seen that positions (722 in FIG. 7, corresponding to EMI) at which the average measured value 3420 of the EMI signals is greater than a reference average value 721 which is a minimum average value for satisfying the EMI condition in the AM frequency region are removed. That is, the upper-limit measured value 3410 and the average measured value 3420 of the EMI signals can satisfy the EMI condition in the AM frequency region through the multi-frequency driving.

According to the above-mentioned embodiments of the present disclosure, it is possible to provide a driving method, a touch sensing circuit 120, a display panel 110, and a touch display device 100 that can prevent electromagnetic interference (EMI). Accordingly, it is possible to prevent deterioration in system stability, display performance, and touch sensing performance due to EMI.

According to embodiments of the present disclosure, it is possible to provide a driving method, a touch sensing circuit 120, a display panel 110, and a touch display device 100 that can prevent EMI in a touch section and prevent unnecessary parasitic capacitance from being generated. According to embodiments of the present disclosure, it is possible to provide a driving method, a touch sensing circuit 120, a display panel 110, and a touch display device 100 that can perform touch driving using a multi-frequency driving method capable of preventing EMI. Here, the multi-frequency driving method is a touch driving method using frequency modulation of a touch driving signal and the frequency modulation of a touch driving signal can be performed using a technique of adjusting a section length of a section (a unit touch section) in which a single frequency is used or a technique of adjusting the number of pulses in a section in which a single frequency is used.

The above description and the accompanying drawings provide an example of the technical idea of the present disclosure for illustrative purposes only. Those skilled in the art will appreciate that various modifications and changes such as combinations, separations, substitutions, and changes of configurations are possible without departing from the essential features of the present disclosure. Therefore, the embodiments disclosed herein are intended to illustrate, not define, the technical idea of the present disclosure, and the scope of the present disclosure is not limited to the embodiments. The scope of the present disclosure shall be construed on the basis of the appended claims in such a manner that all the technical ideas within the range equivalent to the claims belong to the scope of the present disclosure.

The present disclosure encompasses various modifications to each of the examples and embodiments discussed herein. According to the disclosure, one or more features described above in one embodiment or example can be equally applied to another embodiment or example described above. The features of one or more embodiments or examples described above can be combined into each of the embodiments or examples described above. Any full or partial combination of one or more embodiment or examples of the disclosure is also part of the invention.

What is claimed is:

1. A display device comprising:
a display panel including a gate line, a data line, and a pixel connected to the gate line and the data line;
a plurality of touch electrodes; and
a touch sensing circuit configured to:
supply a first touch driving signal to a first touch electrode in a first touch time section of a first frame, the first frame including a first display time section and the first touch time section, and
supply a second touch driving signal to the first touch electrode in a second touch time section of a second frame, the second frame including a second display time section and the second touch time section,
wherein a frequency of the first touch driving signal supplied to the first touch electrode is different from a frequency of the second touch driving signal applied to the first touch electrode.

2. The display device according to claim 1, wherein the first touch time section is after the first display time section, and
wherein the second touch time section is after the second display time section.

3. The display device according to claim 1, wherein a first load-free driving signal is supplied to the data line in the first touch time section at the first frequency,
wherein the second load-free driving signal is supplied to the data line in the second touch period at the second frequency, and
wherein the data line corresponds to the first touch electrode.

4. The display device according to claim 3, wherein the first load-free driving signal has a same phase as the first touch driving signal, and the second load-free driving signal has a same phase as the second touch driving signal.

5. The display device according to claim 3, wherein the data line overlaps the first touch electrode.

6. The display device according to claim 1, wherein a first load-free driving signal is supplied to the gate line in the first touch time section at the first frequency,
wherein the second load-free driving signal is supplied to the gate line in the second touch period at the second frequency, and
wherein the gate line corresponds to the first touch electrode.

7. The display device according to claim 6, wherein the first load-free driving signal has a same phase as the first touch driving signal, and the second load-free driving signal has a same phase as the second touch driving signal.

8. The display device according to claim 6, wherein the data line overlaps the first touch electrode.

9. The display device according to claim 1, wherein a first load-free driving signal is supplied to the data line in the first touch time section at the first frequency,
wherein the second load-free driving signal is supplied to the data line in the second touch period at the second frequency,
wherein a third load-free driving signal is supplied to the gate line in the first touch time section at the first frequency, and
wherein the fourth load-free driving signal is supplied to the gate line in the second touch period at the second frequency.

10. The display device according to claim 9, wherein the data line is configured to receive a data voltage corresponding to an image signal in the first display time section and the second display time section, and the gate line is configured to receive a scan signal in the first display time section and the second display time section.

11. The display device according to claim 10, the data voltage is different from the first and second load-free driving signals.

12. The display device according to claim 10, the scan signal is different from the first and second load-free driving signals.

13. The display device according to claim 1, wherein a length of the first touch time section is equal to a length of the second touch time section, and
wherein a number of pulses of the first touch driving signal in the first touch time section is different from a number of pulses of the second touch driving signal in the second touch time section.

14. The display device according to claim 1, wherein a length of the first touch time section is different from a length of the second touch time section, and
wherein a number of pulses of the first touch driving signal in the first touch time section is equal to a number of pulses of the second touch driving signal in the second touch time section.

15. The display device according to claim 1, wherein the touch sensing circuit is further configured to supply the first touch driving signal to the first touch electrode in a third touch time section of a third frame, the third frame including a third display time section and the third touch time section, and
wherein the second frame is between the first frame and the third frame.

* * * * *